US012774377B2

(12) United States Patent
Moore et al.

(10) Patent No.: US 12,774,377 B2
(45) Date of Patent: Oct. 27, 2026

(54) EVERGREEN UPCYCLING PROCESS FOR THERMOSETS AND THERMOPLASTICS WITH DECONSTRUCTABLE AND UPGRADABLE MONOMERS

(71) Applicant: The Board of Trustees of the University of Illinois, Urbana, IL (US)

(72) Inventors: Jeffrey S. Moore, Urbana, IL (US); Katherine J. Stawiasz, Urbana, IL (US); Benjamin A. Suslick, Urbana, IL (US); Diego M. Alzate-Sanchez, Urbana, IL (US); Oleg Davydovich, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 768 days.

(21) Appl. No.: 18/310,115

(22) Filed: May 1, 2023

(65) Prior Publication Data

US 2023/0348689 A1 Nov. 2, 2023

Related U.S. Application Data

(60) Provisional application No. 63/337,457, filed on May 2, 2022.

(51) Int. Cl.
*C08J 11/20* (2006.01)
*C08G 61/00* (2006.01)

(52) U.S. Cl.
CPC .............. *C08J 11/20* (2013.01); *C08G 61/00* (2013.01); *C08J 2347/00* (2013.01)

(58) Field of Classification Search
CPC ................ C08J 11/10–28; C08J 11/20; C08G 61/00–06
See application file for complete search history.

(56) References Cited

U.S. PATENT DOCUMENTS

2021/0147598 A1 5/2021 Johnson et al.
2021/0253784 A1 8/2021 Metzger et al.
2025/0154333 A1* 5/2025 Saha ...................... C08G 63/60

FOREIGN PATENT DOCUMENTS

WO WO 2021/242636 A1 12/2021
WO WO-2025061945 A1 * 3/2025 .............. C08L 67/02

OTHER PUBLICATIONS

Translation of JP 2003055442 by Goto et al. (Year: 2003).*
Robertson, I.D. et al. Rapid energy-efficient manufacturing of polymers and composites via frontal polymerization. Nature, 557, 223-227. (Year: 2018).*
Suslick, B.A. et al. Scalable Frontal Oligomerization: Insights from Advanced Mass Analysis. Macromolecules 2022, 55, 8234-8241. (Year: 2022).*
Yao, Z. Kinetics on thermal dissociation and oligomerization of dicyclopentadiene in a high temperature & pressure microreactor. Chemical Engineering Science 228 (2020) 115892 (Year: 2020).*
(Continued)

*Primary Examiner* — Christina H. W. Rosebach
(74) *Attorney, Agent, or Firm* — Crowell & Moring LLP

(57) ABSTRACT

Methods for recycling oligomeric units derived from a first polymer into a second polymer are provided herein. Methods of preparing oligomeric macromonomers from oligomeric units are further provided. Methods of polymerizing oligomeric macromonomers are further provided.

20 Claims, 20 Drawing Sheets

(56) References Cited

OTHER PUBLICATIONS

International Search Report and Written Opinion of the International Searching Authority in International Application No. PCT/US2023/066431, dated Oct. 20, 2023 (23 pages).
Anonymous, "Ring Strain" URL:https://en.wikipedia.org/wiki/Ring_strain, Jun. 10, 2023 (6 pages).
Peyton, et al. "Cleavable Comonomers Enable Degradable, Recyclable Thermoset Plastics", Nature, vol. 583, No. 7817: 542-547, Jul. 22, 2020 (23 pages).
Yang, Dan., et al., "Poss-enhanced shape-memory copolymer of polynorbornene derivate and polycyclooctene through ring-opening metathesis polymerization" *Reactive and Functional Polymers*, vol. 71, Issue 11, Nov. 2011 (pp. 1096-1101 (6 pages).

* cited by examiner

EVERGREEN UPCYCLING PROCESS FOR THERMOSETS AND THERMOPLASTICS WITH DECONSTRUCTABLE AND UPGRADABLE MONOMERS

CROSS-REFERENCE TO RELATED APPLICATIONS

The present application claims the benefit of U.S. Provisional Application No. 63/337,457, filed May 2, 2022, the entirety of which is incorporated by reference herein for all purposes.

STATEMENT REGARDED FEDERALLY FUNDED RESEARCH

This invention was made with government support under award 1933932 awarded from the National Science Foundation, DE-AR0001330 sub award 102726 from the Advanced Research Projects Agency-Energy, DE-SC0023457 awarded by the Department of Energy and HR001122C0057 from the Defense Advanced Research Projects Agency. The government has certain rights in the invention.

TECHNICAL FIELD

The present disclosure relates to processes to synthesize and restore polymers.

BACKGROUND

Conventional methods involving synthesis and restoration of polymers derived from cycloalkenes may be limited by the availability of inefficient petroleum-based processes. For example, steam cracking of naphtha may provide dicyclopentadiene ("DCPD") in low yields, such as approximately 14 kg·ton$^{-1}$. However, recent work has described an efficient pathway to synthesize a functionalized cycloalkene, for example, dicyclopentadiene, from plant-based lignocellulose via furfuryl alcohol intermediates, and offers potential for bio-derived dicyclopentadiene.

Currently, oligomeric fragments that are deconstruction products of polymers and thermosets may possess limited functionality for reuse in future generations of polymers.

There is a need to develop environmentally benign polymers. Further, there is a need for upcyclable oligo-olefin species that may provide multi-generational thermoset and thermoplastic materials in an environmentally conscious fashion, with high atom economics and minimal waste generation.

SUMMARY

In an example, the present disclosure provides a method of recycling oligomeric units derived from a first polymer into a second polymer. The method includes: deconstructing the first polymer to produce the oligomeric units, wherein the first polymer and the oligomeric units each include a cycloalkenyl moiety that is not functionalized or ring-strained; endothermically reacting the oligomeric units with an amount of a compound to produce oligomeric macromonomers, wherein the oligomeric macromonomers each include a functionalized cycloalkenyl moiety; and polymerizing the oligomeric macromonomers to produce the second polymer.

In another example, the present disclosure provides a method of preparing oligomeric macromonomers from oligomeric units, including endothermically reacting the oligomeric units with an amount of a second compound to produce the oligomeric macromonomers. The oligomeric macromonomers each include a functionalized cycloalkenyl moiety. The oligomeric units each include cycloalkenyl moieties that are not functionalized or ring-strained.

In yet another example, the present disclosure provides a method of polymerizing oligomeric macromonomers, including: adding an amount of a phosphite ester and an amount of a catalyst to an amount of oligomeric macromonomers, an amount of a third compound, and an amount of a cleavable co-monomer to produce a mixture, the oligomeric macromonomers each including a functionalized cycloalkenyl moiety; and heating the mixture to produce a polymer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the present disclosure may be well understood, there will now be described various forms thereof, given by way of example, reference being made to the accompanying drawings. The components in the figures are not necessarily to scale.

Figure 1:
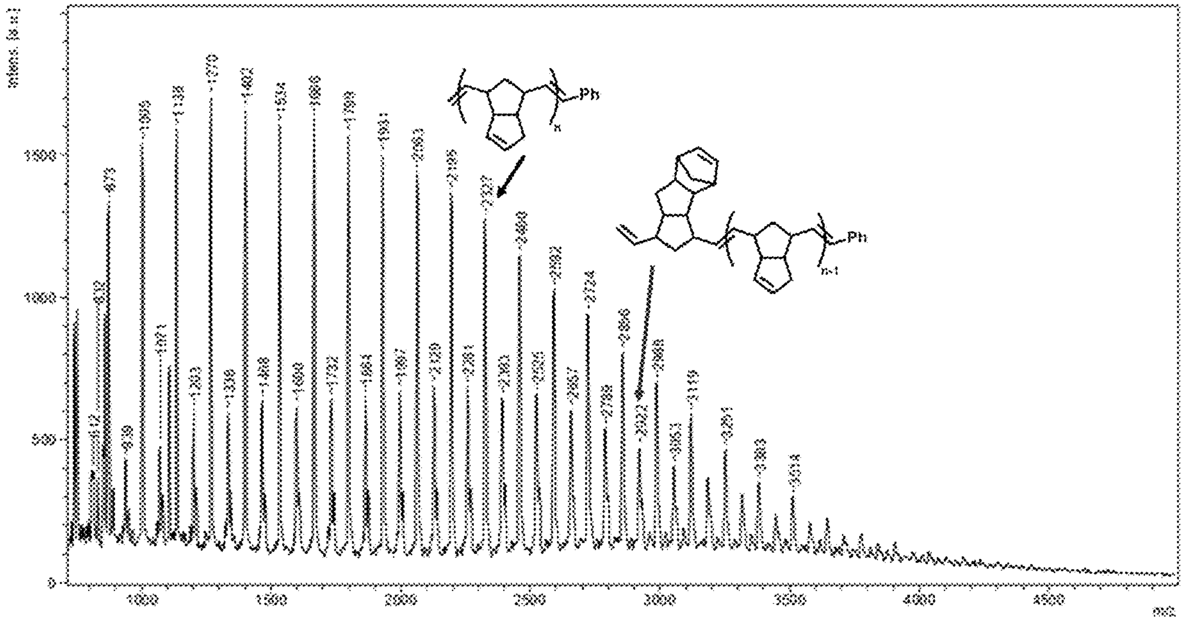
FIG. 1 illustrates a MALDI-TOF mass spectrum of partially functionalized oligo-DCPD ("o(DCPD") resulting from a thermal Diels Alder upcycling process.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The uses of the terms "a" and "an" and "the" and similar referents in the context of describing the present disclosure (especially in the context of the following claims) are to be construed to cover both the singular and the plural, unless otherwise indicated herein or clearly contradicted by context. The use of the term "plurality of" is defined by the Applicant in the broadest sense, superseding any other implied definitions or limitations hereinabove or hereinafter unless expressly asserted by Applicant to the contrary, to mean a quantity of more than one. All methods described herein may be performed in any suitable order unless otherwise indicated herein by context.

As will be understood by one skilled in the art, for any and all purposes, all ranges recited herein also encompass any and all possible sub-ranges and combinations of sub-ranges thereof, as well as the individual values making up the range, particularly integer values. It is therefore understood that each unit between two particular units is also disclosed. For example, if "10 to 15" is disclosed, then 11, 12, 13, and 14 are also disclosed, individually, and as part of a range. A recited range (for example, weight percentages or carbon groups) includes each specific value, integer, decimal, or identity within the range. Any listed range may be easily recognized as sufficiently describing and enabling the same range being broken down into at least equal halves, thirds, quarters, fifths, or tenths. As will also be understood by one skilled in the art, all language such as "up to," "at least," "greater than," "less than," "more than," "or more," and the like, include the number recited and such terms refer to ranges that may be subsequently broken down into sub-ranges. In the same manner, all ratios recited herein also include all sub-ratios falling within the broader ratio. Accordingly, specific values recited for radicals, substituents, and ranges are for illustration only; the specific values do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or examples whereby any one or more of the recited elements, species, or examples may be excluded from such categories or examples, for example, for use in an explicit negative limitation.

As used herein, the terms "comprise(s)," "include(s)," "having," "has," "may," "contain(s)," and variants thereof, are intended to be open-ended transitional phrases, terms, or words that do not preclude the possibility of additional acts or structures. The present description also contemplates other examples, "comprising," "consisting of," and consisting essentially of," the examples or elements presented herein, whether explicitly set forth or not.

In describing elements of the present disclosure, the terms "$1^{st}$," "$2^{nd}$," "first," "second," "A," "B," "(a)," "(b)," and the like may be used herein. These terms are only used to distinguish one element from another element, but do not limit the corresponding elements irrespective of the nature or order of the corresponding elements.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art.

As used herein, the term "about," when used in the context of a numerical value or range set forth means a variation of ±15%, or less, of the numerical value. For example, a value differing by ±15%, ±14%, ±10%, or ±5%, among others, would satisfy the definition of "about," unless more narrowly defined in particular circumstances.

The term "alkyl," by itself or as part of another substituent, refers, unless otherwise stated, to a straight, branched, or cyclic chain aliphatic hydrocarbon ("cycloalkyl") monovalent radical having the number of carbon atoms designated (in other words, "$C_1$-$C_{20}$" means one to twenty carbons, and includes $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, and $C_{19}$). Examples include methyl, ethyl, propyl, isopropyl, cyclopropyl, butyl, isobutyl, sec-butyl, tert-butyl, cyclobutyl, methylcyclopropyl, cyclopropylmethyl, pentyl, neopentyl, hexyl, and cyclohexyl.

Each of the terms “alkene” and “olefin,” by itself or as part of another substituent, refers, unless otherwise stated, to a stable mono-unsaturated or di-unsaturated or poly-unsaturated (“polyene”) straight chain, branched chain, or cyclic hydrocarbon (“cycloalkene”), “unsaturated” meaning a carbon-carbon double bond (—CH═CH—). The term “diene” refers to a hydrocarbon including two double bonds. Examples of dienes may include 1,4-butadiene, 1,3-pentadiene, 1,4-pentadiene, and cyclopentadiene.

The term “alkenyl,” by itself or as part of another substituent, refers to a stable mono-unsaturated or di-unsaturated or poly-unsaturated straight chain, branched chain, or cyclic hydrocarbon (“cycloalkenyl”) monovalent radical having the number of carbon atoms designated. Examples may include vinyl, propenyl, allyl, crotyl, isopentenyl, butadienyl, 1,3-pentadienyl, 1,4-pentadienyl, cyclopentenyl, cyclopentadienyl, and the higher homologs and isomers.

The term “functionalized,” in the context of cycloalkenes, refers, unless otherwise stated, to a cycloalkene being ring-strained or having a nonhydrocarbon substituent on one or more of the carbons of the cyclic moiety of the cycloalkene.

The term “ring-strained,” in the context of cycloalkenes, refers, unless otherwise stated, to the relative higher energy of a cycloalkene as a result of the number of carbons making up one or more of the cyclic moieties of the cycloalkene causing compression or “strain” to the natural angles between carbon-carbon bonds at each carbon atom of the one or more cyclic moieties, wherein the compression or strain would be alleviated (and the energy would be decreased) were the one or more cyclic moieties to undergo a reaction that would “open” the ring at the alkene bond.

The term “aromatic” generally refers to a carbocycle or heterocycle having one or more polyunsaturated rings having aromatic character (in other words, having (4n+2) delocalized π (pi) electrons where n is an integer).

The term “aryl,” by itself or in combination with another substituent, refers, unless otherwise stated, to a carbocyclic aromatic system substituent containing one or more rings (typically one, two, or three rings), wherein such rings may be attached together in a pendant manner, such as biphenyl, or may be fused, such as naphthalene. Examples may include phenyl, benzyl, anthracyl, and naphthyl. Preferred are phenyl, benzyl, and naphthyl; most preferred are phenyl and benzyl.

The terms “heterocyclic,” “heterocycle,” and “heterocyclyl,” by themselves or in combination with another substituent, refer, unless otherwise stated, to a stable, mono-, or multi-cyclic ring system that consists of carbon atoms and at least one heteroatom independently selected from N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. Non-limiting examples of monocyclic heterocyclic groups include: aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, piperazine, N-methylpiperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxidine.

The terms “heteroaryl” and “heteroaromatic,” by themselves or in combination with another substituent, refer, unless otherwise stated, to a heterocyclic having aromatic character. Non-limiting examples of monocyclic heteroaryl groups include: pyridyl; pyrazinyl; pyrimidinyl, particularly 2- and 4-pyrimidinyl; pyridazinyl; thienyl; furyl; pyrrolyl, particularly 2-pyrrolyl; imidazolyl; thiazolyl; oxazolyl; pyrazolyl, particularly 3- and 5-pyrazolyl; isothiazolyl; 1,2,3-triazolyl; 1,2,4-triazolyl; 1,3,4-triazolyl; tetrazolyl; 1,2,3-thiadiazolyl; 1,2,3-oxadiazolyl; 1,3,4-thiadiazolyl; and 1,3,4-oxadiazolyl.

Polycyclic heterocycles include both aromatic and non-aromatic polycyclic heterocycles, non-limiting examples of which include: indolyl, particularly 3-, 4-, 5-, 6-, and 7-indolyl; indolinyl; indazolyl, particularly 1H-indazol-5-yl; quinolyl; tetrahydroquinolyl; isoquinolyl, particularly 1- and 5-isoquinolyl; 1,2,3,4-tetrahydroisoquinolyl; cinnolyl; quinoxalinyl, particularly 2- and 5-quinoxalinyl; quinazolinyl; phthalazinyl; naphthyridinyl, particularly 1,5- and 1,8-naphthyridinyl; 1,4-benzodioxanyl; coumaryl; dihydrocoumaryl; benzofuryl, particularly 3-, 4-, 5-, 6-, and 7-benzofuryl; 2,3-dihydrobenzofuryl; 1,2-benzoisoxazoyl; benzothienyl, particularly 3-, 4-, 5-, 6-, and 7-benzothienyl; benzoxazolyl; benzothiazolyl, particularly 2- and 5-benzothiazolyl; purinyl; benzimidazolyl, particularly 2-benzimidazolyl; benztriazolyl; thioxanthinyl; carbazolyl; carbolinyl; acridinyl; pyrrolizidinyl; pyrrolo[2,3-b]pyridinyl, particularly 1H-pyrrolo[2,3-b]pyridin-5-yl; and quinolizidinyl. Particularly preferred are 4-indolyl, 5-indolyl, 6-indolyl, 1H-indazol-5-yl, and 1H-pyrrolo[2,3-b]pyridin-5-yl.

The term “halogen,” by itself or as part of another substituent, refers, unless otherwise stated, to a monovalent fluorine, chlorine, bromine, or iodine atom.

The term “boronate ester group” refers to a functional group, moiety, or sub stituent that is substituted for a hydrogen atom of an organic compound, and is of formula (II):

(II)

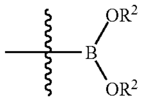

wherein each $R^2$ is independently a straight-chain, branched, or cyclic $(C_1\text{-}C_{20})$alkyl group, or an aryl, heteroaryl, or heterocyclic group, or together with boron and oxygen, the $R^2$ groups form a cyclic moiety; and

is the point of attachment of the boronate ester group to a carbon of the organic compound. Examples of boronate ester groups may include boronic acid pinacol ester and boronic acid trimethylene glycol ester:

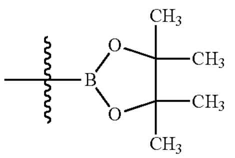

boronic acid pinacol ester;

-continued

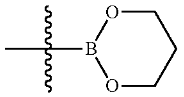

boronic acid trimethylene glycol ester.

The term “epoxy group” refers to a non-aromatic, heterocyclic functional group, moiety, or substituent of an organic compound in which the heterocycle is characterized by three atoms connected by single bonds, two of the atoms being carbon and the third being oxygen. The general structural formula of an epoxy group is:

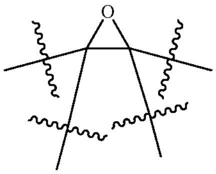 [SMILES: *C1(*)OC1(*)*]

wherein each

independently represents a point of attachment to or within an organic compound or to a hydrogen atom.

The term “ester group” refers to a functional group, moiety, or substituent of an organic compound such that the organic compound has a carboxyl group

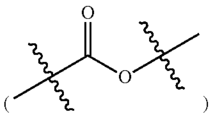 [SMILES: *OC(*)=O]

in either direction between two carbon atoms. Ester group substituents may have the general formula (III) or (IV):

(III)

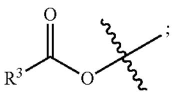

(IV)

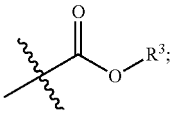

wherein $R^3$ is a straight-chain, branched, or cyclic ($C_1$-$C_{20}$) alkyl group, or an aryl, heteroaryl, or heterocyclic group; and

is the point of attachment of the ester group substituent to a carbon of the organic compound. Examples of ester group substituents may include an acrylate group:

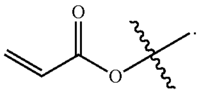

acrylate group

The term “amide group” refers to a functional group, moiety, or substituent of an organic compound such that the organic compound includes

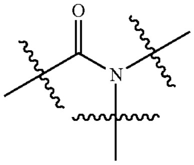 [SMILES: *C(=O)N(*)*]

in either direction, between carbon atoms, or between one or two hydrogen atoms and a carbon atom, or between a hydrogen atom and two carbon atoms. Amide group substituents may have the general formula (V) or (VI):

(V)

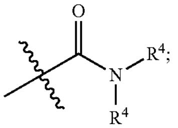

(VI)

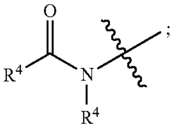

wherein each $R^4$ is independently hydrogen, or a straight-chain, branched, or cyclic ($C_1$-$C_{20}$)alkyl group, or an aryl, heteroaryl, or heterocyclic group; and

is the point of attachment of the amide group substituent to a carbon of the organic compound.

The terms “oligomers” and “oligomeric units” refer, unless otherwise stated, to linear or branched molecules made up of short chains of from 2 to 40 repeating monomeric units.

The term "oligomeric macromonomer" refers, unless otherwise stated, to an adduct resulting from a reaction of a moiety of one or more monomeric units of an oligomer with another compound.

The terms "endothermic" and "endothermically," unless otherwise stated, refer to chemical reactions in which more energy, such as heat, is absorbed by the reactants from the environment when the bonds are broken than the amount of energy that is released when new bonds are formed in the products.

The term "frontal polymerization," refers, unless otherwise stated, to a process in which the polymerization reaction propagates through a vessel or a substance. There are three types of frontal polymerizations: thermal frontal polymerization ("TFP") that uses an external thermal energy source to initiate the front; photofrontal polymerization ("PFP"), in which the localized reaction is driven by an external UV source; and isothermal frontal polymerization ("IFP"), which relies on the Norrish-Trommsdorff, or gel effect, that occurs when monomer and initiator diffuse into a polymer seed (small piece of polymer). Thermal frontal polymerization begins when a heat source contacts a solution of monomer and a thermal initiator or catalyst. Alternatively, a UV source may be applied if a photoinitiator is also present. The area of contact (or UV exposure) has a faster polymerization rate, and the energy from the exothermic polymerization diffuses into the adjacent region, raising the temperature and increasing the reaction rate in that location. The result is a localized reaction zone that propagates down the reaction vessel as a thermal wave.

The term "ring-opening metathesis polymerization" ("ROMP"), refers, unless otherwise stated, to a type of olefin metathesis chain-growth polymerization that may produce industrially important products. The driving force of the reaction is relief of ring strain in cyclic olefins, which may be referred to as "functionalized cycloalkenes." Thus, "frontal ring-opening metathesis polymerization" ("FROMP") entails the conversion of a monomer into a polymer via a localized exothermic reaction zone that propagates through the coupling of thermal diffusion and Arrhenius reaction kinetics. The pot life, gel time, and reaction kinetics may be controlled through various modifications of the polymerization chemistry.

The term "rheological modifier" refers to a chemical species that may be added to a formulation or composition so as to alter the flow behavior or viscosity of the formulation or composition.

The term "Diels Alder reaction" refers to a chemical cycloaddition reaction between a conjugated 1,3-diene and a dienophile. The dienophile may be a double bond, such as an alkene double bond; or a triple bond, such as an alkyne triple bond. The reaction produces an unsaturated six-membered ring adduct that includes all atoms of the 1,3-diene and the dienophile molecules. In the example shown below, 1,3-butadiene reacts with ethylene to form cyclohexene:

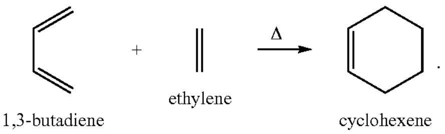

1,3-butadiene ethylene cyclohexene

In another example, cyclopentadiene reacts with itself at room temperature to form dicyclopentadiene:

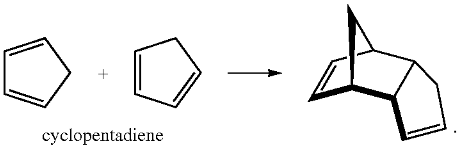

cyclopentadiene dicyclopentadiene

Cyclopentadiene is not regularly available in monomeric form. Instead, when heated, dicyclopentadiene may undergo a retro-Diels-Alder reaction to provide cyclopentadiene, which may then be used as a reagent.

Herein is described a series of processes to synthesize and restore polymers derived from cycloalkenes. An environmentally benign polycycloalkene material may incorporate a cleavable co-monomer into the polymeric backbone via a FROMP reaction. The cleavable co-monomer allows for the polycycloalkene to be deconstructed into smaller, oligomeric fragments. The oligomeric fragments may be upcycled by a thermal Diels Alder reaction with a diene to form an oligomeric macromonomer. The oligomeric macromonomers may then be used as reagents for FROMP reactions to provide new polymeric thermoset or thermoplastic materials. Accordingly, the disclosure provides a three-step process of "deconstruct," "upcycle," and "restore" to provide multi-generational thermoset and thermoplastic materials in a highly environmentally conscious fashion, with high atom economics and minimal waste generation. The three-step process is illustrated below in Scheme A.

Scheme A.

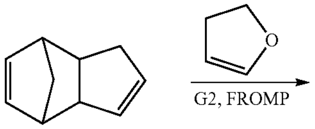

DCPD (including bio-derived DCPD)

-continued

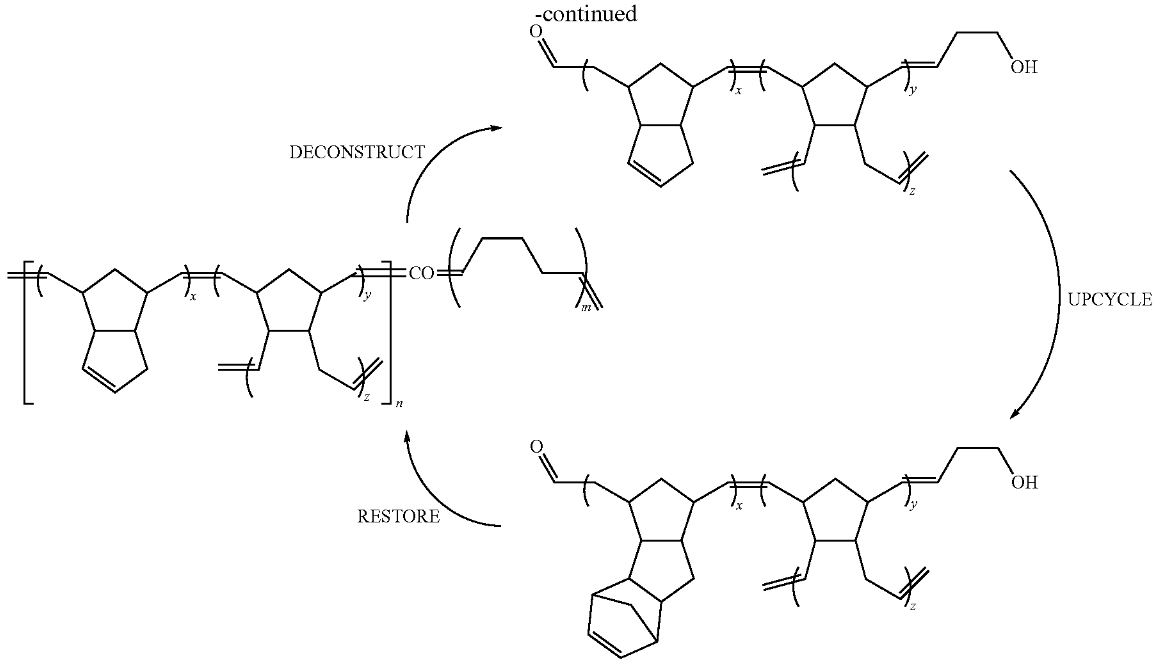

In an example, the present disclosure provides a method for recycling oligomeric units derived from a first polymer into a second polymer. The method includes deconstructing the first polymer to produce oligomeric units. The first polymer and the oligomeric units each include a cycloalkenyl moiety that is not functionalized or ring-strained. In certain examples, the deconstructing includes contacting the first polymer with an acidic solution in a solvent. Examples of acidic solutions may include solutions of HCl, HI, HBr, $H_2SO_4$, $H_3O^+$, $HNO_3$, $H_3PO_4$, and $CH_3CO_2H$ in a solvent. In certain examples, a concentration of the acid in the solvent may be from 0.5 M to 6.0 M, including from 0.5 M, or from 1.0 M, or from 1.5 M, or from 2.0 M, or from 2.5 M, or from 3.0 M, or from 3.5 M, or from 4.0 M, or from 4.5 M, or from 5.0 M, or from 5.5 M; or to 1.0 M, or to 1.5 M, or to 2.0 M, or to 2.5 M, or to 3.0 M, or to 3.5 M, or to 4.0 M, or to 4.5 M, or to 5.0 M, or to 5.5 M; or a range made from any two of the foregoing concentrations, including any subranges therebetween. In other examples, a solvent may be water or an ether. Examples of ether solvents may include cyclopentyl methyl ether ("CPME"), diethyl ether ("$Et_2O$"), diglyme (diethylene glycol dimethyl ether), 1,2-dimethoxyethane ("DME"), 1,4-dioxane, methyl t-butyl ether ("MTBE"), tetrahydrofuran ("THF"), and the like.

In other examples, the deconstructing includes contacting the first polymer with a basic solution. Examples of basic solutions may include solutions of $CH_3^-$, $CH_2{=}CH^-$, $H^-$, $NH_2^-$, $HC{\equiv}C^-$, $CH_3O^-$, $HO^-$, $HS^-$, $CO_3^{-2}$, $NH_3$, $HCO_2^-$, $MeO^-$, and $EtO^-$ in a solvent. A concentration of the base in the solvent may be from 0.5 M to 6.0 M, including from 0.5 M, or from 1.0 M, or from 1.5 M, or from 2.0 M, or from 2.5 M, or from 3.0 M, or from 3.5 M, or from 4.0 M, or from 4.5 M, or from 5.0 M, or from 5.5 M; or to 1.0 M, or to 1.5 M, or to 2.0 M, or to 2.5 M, or to 3.0 M, or to 3.5 M, or to 4.0 M, or to 4.5 M, or to 5.0 M, or to 5.5 M; or a range made from any two of the foregoing concentrations, including any sub-ranges therebetween.

In still other examples, the deconstructing includes contacting the first polymer with a source of fluoride ion. Examples of sources of fluoride ion may include tetramethylammonium fluoride, tetrabutylammonium fluoride, cobaltocenium fluoride, and imidazolium fluoride.

In an example, the method for recycling oligomeric units derived from a first polymer into a second polymer includes endothermically reacting the oligomeric units with an amount of a compound to produce oligomeric macromonomers. In certain examples, the oligomeric macromonomers each include a functionalized cycloalkenyl moiety. The oligomeric units that may result from deconstructing a polymer may not directly undergo subsequent FROMP reactions due to the absence of a ring-strained cycloalkenyl moiety. The embodied energy of the deconstruction products may be similar to the embodied energies of unfunctionalized cyclopentene ($\Delta H_p \approx 6$ kcal·mol$^{-1}$), which cannot undergo a FROMP reaction. However, the oligomeric units may be functionalizable by reaction with an amount of a compound to produce an oligomeric macromonomer.

In certain examples, an oligomeric unit may undergo a Diels Alder reaction with a compound that is a diene to provide an oligomeric macromonomer that is an adduct including a functionalized cycloalkenyl moiety. The oligomeric macromonomer thereby includes a functionalized cycloalkenyl moiety and may be submitted to a subsequent FROMP reaction to generate a second polymer. Examples of the compound may include dicyclopentadiene. Examples of the functionalized cycloalkenyl moiety may include a norbornenyl moiety:

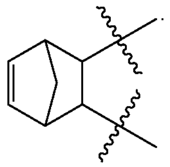

norbornenyl moiety

In other examples, endothermically reacting the oligomeric units may include applying a heat source to heat the oligomeric units and the amount of the compound to a temperature of from about 100 to about 500° C., including, for example, from about 125° C., or from about 150° C., or from about 175° C., or from about 200° C., or from about 225° C., or from about 250° C., or from about 275° C., or from about 300° C., or from about 325° C., or from about 350° C., or from about 375° C., or from about 400° C., or from about 425° C., or from about 450° C., or from about 475° C.; or to about 125° C., or to about 150° C., or to about 175° C., or to about 200° C., or to about 225° C., or to about 250° C., or to about 275° C., or to about 300° C., or to about 325° C., or to about 350° C., or to about 375° C., or to about 400° C., or to about 425° C., or to about 450° C., or to about 475° C.; or any range of temperatures made from any two of the foregoing temperatures; including any sub-ranges therebetween.

In still other examples, the oligomeric macromonomers each have a higher mass than the oligomeric units. For example, a mass difference between the oligomeric macromonomers and the oligomeric units may correspond at least approximately to a molecular mass of the compound reacted with the oligomeric units. Alternatively, a mass difference between the oligomeric macromonomers and the oligomeric units may correspond at least approximately to a multiple of the molecular mass of the compound reacted with the oligomeric units. Examples of multiples of the molecular mass of the compound may include twice, three times, four times, five times, six times, seven times, eight times, nine times, ten times, or more than ten times the molecular mass of the compound. The oligomeric macromonomers may have a distribution of molecular masses, and a mass difference between the oligomeric macromonomers and the oligomeric units may correspond to a multiple of a molecular mass of the compound, or a plurality of different multiples of the molecular mass of the compound. In certain examples, the compound may be available as a dimer of an active species, wherein the active species reacts with the oligomeric units to produce the oligomeric macromonomers. Therefore, a mass difference between the oligomeric macromonomers and the oligomeric units may correspond to a multiple of a molecular mass of the active species, or a plurality of different multiples of the molecular mass of the active species. Examples of the compound may be dicyclopentadiene and the active species may be cyclopentadiene.

In another example, the oligomeric units may be the product of a frontal ring-opening methathesis oligomerization ("FROMO") reaction that includes heating a mixture of a functionalized cycloalkene, a chain transfer agent ("CTA"), a catalyst, and a phosphite ester. Similar to the oligomeric units that are products of deconstructing a first polymer, the oligomeric units produced from a FROMO reaction may not include a functionalized or ring-strained cycloalkenyl moiety, and therefore may not react if submitted to FROMP reaction conditions. Similar to the oligomeric units that are products of deconstructing a first polymer, the oligomeric units produced from a FROMO reaction may undergo a Diels Alder reaction with a compound that is a diene to provide an oligomer macromonomer that is an adduct including a functionalized cycloalkenyl moiety. The oligomeric macromonomer thereby includes a functionalized cycloalkenyl moiety and may be submitted to a subsequent FROMP reaction to generate a second polymer.

Examples of functionalized cycloalkenes for a FROMO reaction may include:

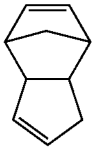

dicyclopentadiene

;

norbornene

; and

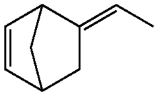

.

5-ethylidene-2-norbornene

Examples of chain transfer agents for a FROMO reaction may include mono-substituted olefins of formula (I):

(I)

wherein R is a straight-chain, branched, or cyclic $(C_1-C_{20})$ alkyl group or $(C_1-C_{20})$alkoxy group, or an aryl, heteroaryl, or heterocyclic group, optionally substituted with a halogen atom, a hydroxy group, a boronate ester group, an epoxy group, an acrylate group, an ester group, or an amide group. Examples of chain transfer agents may include:

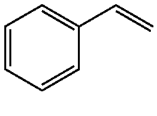

;

styrene

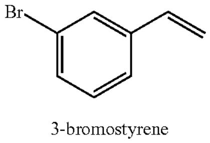

;

3-bromostyrene

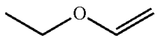

; and ethyl vintyl ether

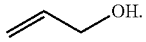

prop-2-en-1-ol

In certain examples, the molar ratio of the amount of the functionalized cycloalkene to the amount of the chain transfer agent may be from about 1:1 to about 50:1, including from about 2:1, or from about 3:1, or from about 4:1, or from about 5:1, or from about 6:1, or from about 7:1, or from about 8:1, or from about 9:1, or from about 10:1, or from about 15:1, or from about 20:1, or from about 25:1, or from about 30:1, or from about 35:1, or from about 40:1, or from about 45:1; or to about 2:1, or to about 3:1, or to about 4:1, or to about 5:1, or to about 6:1, or to about 7:1, or to about 8:1, or to about 9:1, or to about 10:1, or to about 15:1, or to about 20:1, or to about 25:1, or to about 30:1, or to about 35:1, or to about 40:1, or to about 45:1; including any range made from any two of the foregoing ratios; and including any sub-ratios therebetween.

In other examples, the phosphite ester may be of a formula $P(OR^1)_3$, wherein $R^1$ are all simultaneously or each independently methyl, ethyl, n-butyl, tert-butyl, or phenyl.

In still other examples, a molar ratio of the amount of the catalyst to the amount of the functionalized cycloalkene may be less than about 1:100, or less than about 1:200, or less than about 1:300, or less than about 1:400, or less than about 1:500, or less than about 1:600, or less than about 1:700, or less than about 1:800, or less than about 1:900, or less than about 1:1000, or less than about 1:2000, or less than about 1:3000, or less than about 1:4000, or less than about 1:5000, or less than about 1:6000, or less than about 1:7000, or less than about 1:8000, or less than about 1:9000, or less than about 1:10000; or a range made from any of the two foregoing ratios; and including any sub-ratios therebetween.

In still other examples, the catalyst may be a Grubbs catalyst. Examples of Grubbs catalysts may include G2:

G2

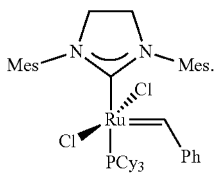

In still other examples, heating the mixture may include applying a heat source to the mixture at a temperature of from about 50 to about 500° C., including, for example, from about 75° C., or from about 100° C., or from about 125° C., or from about 150° C., or from about 175° C., or from about 200° C., or from about 225° C., or from about 250° C., or from about 275° C., or from about 300° C., or from about 325° C., or from about 350° C., or from about 375° C., or from about 400° C., or from about 425° C., or from about 450° C., or from about 475° C.; or to about 75° C., or to about 100° C., or to about 125° C., or to about 150° C., or to about 175° C., or to about 200° C., or to about 225° C., or to about 250° C., or to about 275° C., or to about 300° C., or to about 325° C., or to about 350° C., or to about 375° C., or to about 400° C., or to about 425° C., or to about 450° C., or to about 475° C.; or any range of temperatures made from any two of the foregoing temperatures; including any sub-ranges therebetween.

In still other examples, a degree of polymerization for oligomeric units may be an average degree of polymerization. In still other examples, a degree or average degree of polymerization may be a number-average degree of polymerization of from 3 to 30, including, for example, from 4, or from 5, or from 6, or from 7, or from 8, or from 9, or from 10, or from 11, or from 12, or from 13, or from 14, or from 15, or from 16, or from 17, or from 18, or from 19, or from 20, or from 21, or from 22, or from 23, or from 24, or from 25, or from 26, or from 27, or from 28, or from 29; or to 4, or to 5, or to 6, or to 7, or to 8, or to 9, or to 10, or to 11, or to 12, or to 13, or to 14, or to 15, or to 16, or to 17, or to 18, or to 19, or to 20, or to 21, or to 22, or to 23, or to 24, or to 25, or to 26, or to 27, or to 28, or to 29; or a range made from any two of the foregoing numbers; including any sub-ranges therebetween.

In still other examples, when a molar ratio of the amount of the functionalized cycloalkene to the amount of the chain transfer agent is about 5:1, an average degree of polymerization of the oligomers produced by the method may be 5. In still other examples, when a molar ratio of the amount of the functionalized cycloalkene to the amount of the chain transfer agent is about 35:1, an average degree of polymerization of the oligomers produced by the method may be 28.

Scheme B below illustrates an example of a competitive, or tandem, catalytic cycles for a FROMO reaction of DCPD with styrene as a chain transfer agent. According to Scheme B, oligo-DCPD is propagated at a propagation reaction rate with rate constant $k_p$, and propagation, and consequently, number-average degree of polymerization, depends on the molar ratio of DCPD to styrene. The higher the molar ratio of DCPD relative to styrene, the greater the extent of propagation, and the greater the number-average degree of polymerization. The lower the molar ratio of DCPD relative to styrene, the more that styrene may compete with DCPD. According to Scheme B, styrene undergoes a cross-metathesis reaction to terminate propagation, at a termination reaction rate with a rate constant $k_t$. The rate constants $k_p$ and $k_t$ are comparable, so the propagation and termination reactions are competitive. Therefore, the degree of polymerization of oligo-DCPD is controllable based on relative molar amounts of DCPD and styrene used in the reaction.

Scheme B

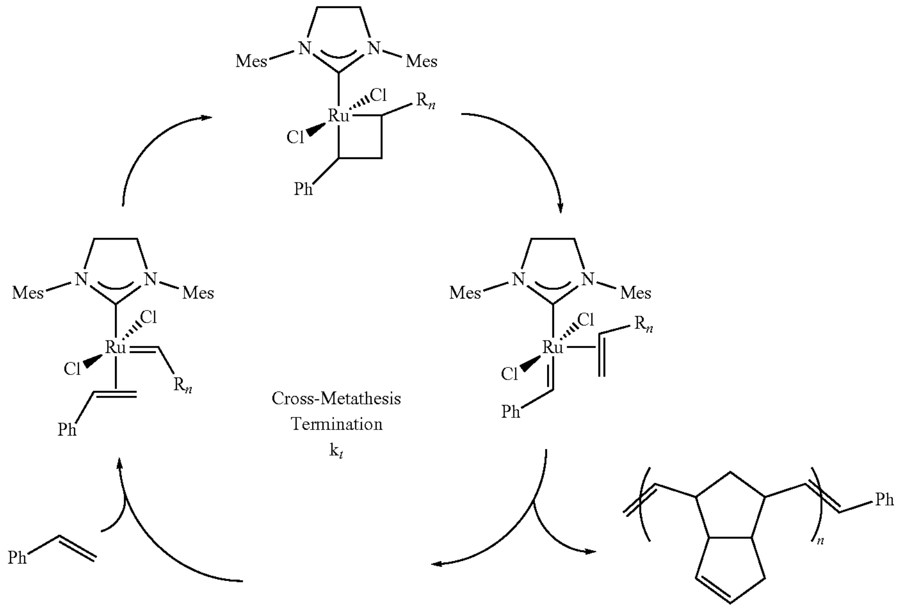

oDCPD

-continued

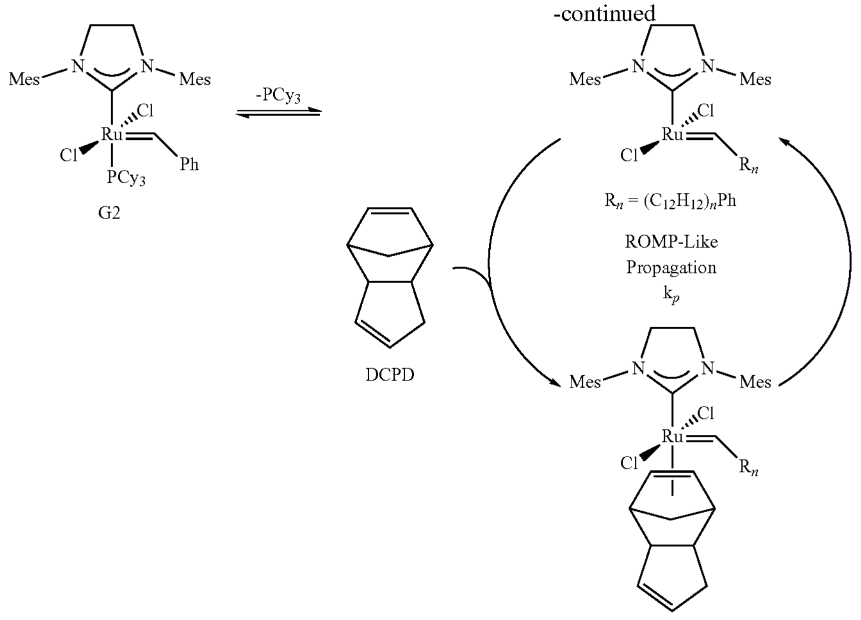

G2

DCPD

In an example, the method for recycling oligomeric units derived from a first polymer into a second polymer includes polymerizing the oligomeric macromonomers to produce the second polymer, such as by a FROMP reaction. In certain examples, the polymerizing may include: adding an amount of a phosphite ester and an amount of a catalyst to an amount of the oligomeric macromonomers, a functionalized cycloalkene, and an amount of a cleavable co-monomer to provide a mixture; and heating the mixture to produce the second polymer.

In certain examples, the catalyst may be a Grubbs catalyst. In other examples, the catalyst may be G2.

In certain examples, the functionalized cycloalkene may be dicyclopentadiene, norbornene, 5-ethylidene-2-norbornene, or 1,5-dicyclooctadiene.

In certain examples, a cleavable co-monomer may be a compound that, once polymerized, as part of the second polymer, has functional groups that may be susceptible to deconstruction conditions such as an acidic solution, a basic solution, or a source of fluoride ion that would provide oligomeric units as products as a result of the deconstruction conditions. Examples of a cleavable co-monomer may include 2,3-dihydrofuran ("DHF"):

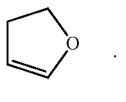

2,3-dihydrofuran ("DHF")

In certain examples of polymerizing, the phosphite ester may be a phosphite ester of formula $P(OR^1)_3$, wherein $R^1$ are all simultaneously or each independently methyl, ethyl, n-butyl, tert-butyl, or phenyl.

The compositions and methods described above may be better understood in connection with the following Examples. In addition, the following non-limiting examples are an illustration. The illustrated methods are applicable to other examples of polymers, oligomeric units, oligomeric macromonomers, functionalized cycloalkenes, dienes, cleavable monomers, deconstruction conditions, catalysts, phosphite esters, and/or chain transfer agents. The procedures described as general methods describe what is believed will be typically effective to prepare the compositions indicated. However, the person skilled in the art will appreciate that it may be necessary to vary the procedures for any given example of the present disclosure, for example, vary the order or steps and/or the chemical reagents used.

EXAMPLES

I. Materials.

All reactions, unless otherwise noted, were performed under an ambient atmosphere. Dicyclopentadiene ("DCPD," ≥96%), 2,3-dihydrofuran ("DHF"), tributyl phosphate ($P(O^nBu)_3$, "TBP," 95%), second generation Grubbs catalyst ($[(SIMes)Ru({=}CHPh)(PCy_3)Cl_2]$, "G2"), and cyclopentyl methyl ether ("CPME"), were purchased from Sigma-Aldrich and used without further purification.

II. Characterization.

A. Spectrometry and Spectroscopy

All $^1H$ and $^{13}C$ NMR experiments were carried out using a Varian VXR-500 FT-NMR spectrometer equipped with a 5 mm Nalorac Quad probe or on a 500 MHz Bruker Avance III HD NMR spectrometer equipped with a 60-position SampleXpress autosampler and a multi-nuclear liquid nitrogen-cooled CryoProbe.

B. Size Exclusion Chromatography ("SEC")

Size exclusion chromatography was performed on an Agilent 1260 Infinity system equipped with an isocratic pump, degasser, autosampler, and a series of 4 Waters HR Styragel columns (7.8×300 mm, HR1, HR3, HR4, and HR5) in THF at 25° C. and a flow rate of 1 $mL \cdot min^{-1}$. The system was equipped with a triple detection system that includes an Agilent 1200 series G1362A Infinity Refractive Index Detector ("RID"), a Wyatt Viscostar II viscometer detector, and a Wyatt MiniDAWN Treos 3-angle light-scattering detector. Molecular weights ($\overline{M}_w$ and $\overline{M}_n$) and dispersities (Đ) were determined by a 12-point conventional column calibration with narrow dispersity polystyrene ("PS") standards ranging from 980 to 1,013,000 Da. The error in the absolute values measured in SEC may vary substantially, because the calibration assumes that a sample behaves similarly to PS (the error in the measurement is ±10.7%). Trends in molecular weight are generally considered to be reliable with this type of calibration.

C. Matrix Assisted Laser Desorption Ionization Time of Flight ("MALDI-TOF")

Oligomer (10 mg·mL$^{-1}$), trans-2-[3-(4-tert-Butylphenyl)-2-methyl-2-propenylidene]malononitrile ("DCTB") (20 mg·mL$^{-1}$), and AgTFA (1 mg·mL$^{-1}$) were independently dissolved in THF. Then 10 μL of oligomer, 30 μL of DCTB, and 1 μL of AgTFA were mixed to form a solution. Finally, 5 μL of the solution was spotted in a MALDI plate and analyzed with a Bruker Daltonics UltrafleXtreme MALDITOFTOF instrument. All species were ionized as $Ag^+$ adducts. Mass-spectral peaks were picked using the FlexAnalysis software package. The automatic peak-picking algorithm method determined the centroid of the low-resolution MALDI peaks with a signal-to-noise ratio of at least 10 and peak-widths of at least 4 m/z units. The peak-picked MALDI values were used for subsequent analyses. The number average molecular weight ($\overline{M}_n$) was calculated from the MALDI-TOF intensity ($N_i$) and the molecular weight ($M_i$) as $Ag^+$ (+107.9 m/z) adducts according to the following equation (1):

$$\overline{M}_n = \frac{\sum N_i \times M_i}{\sum N_i}. \quad (1)$$

The weight average molecular weight ($\overline{M}_w$) was calculated according to the following equation (2):

$$\overline{M}_w = \frac{\sum N_i \times M_i^2}{\sum N_i \times M_i}. \quad (2)$$

Finally, dispersity (Đ) was calculated as the ratio $\overline{M}_w/\overline{M}_n$. A full MALDI trace is illustrated in FIG. 1.

The derivation of $\overline{M}_w$ and $\overline{M}_n$ by MALDI relies on several assumptions and approximations. First, the identification of species requires that a sufficient concentration of analyte reach the MS-detector. The probability of detection is governed by the concentration of the analyte within the bulk sample and the propensity for ionization. It is assumed that all oligomer species ionize to the same degree and that the MS-intensity results only from the bulk concentration, but the assumption does not hold true over a large m/z range or with oligomers bearing vastly different functionalities. Second, a typical MALDI experiment only records species with m/z in the range of ≈0.6 to 10 kDa. Therefore, MALDI tends to overestimate oligomer molecular weights. The absolute values must be considered with caution.

D. Kendrick Mass-Analysis

Kendrick mass-analyses of the MALDI data exploits mass referencing. The first step in Kendrick mass-analysis involves re-referencing the peak-picked MALDI spectrum. The International Union of Pure and Applied Chemistry ("IUPAC") system indexes all atomic masses relative to $^{12}C$ (12.0000 Da). Any fractional values, therefore, occur as the result of atom types other than $^{12}C$. For small-molecule organics, Kendrick mass-analysis proposes that methylene ($^{12}C^1H_2$; IUPAC m/z=14.0157 Da) provides a better referencing point. In the new Kendrick mass scale, the monoisotopic mass of methylene is redefined as 14.0000, and all other masses are adjusted by the ratio of the two masses (in other words, 14.0000/14.0157). All non-integer values in the new mass scale arise from fragments other than $^{12}C_1H_2$. Thereby, Kendrick mass-analysis enables the generation of a second dimension for analysis, which differentiates species of different masses.

For high-resolution data sets, each individual isotopomer is detectable. In such data sets, the fractional mass difference may provide a useful second dimension for discrimination. Fractional masses are rounded to the nearest whole number. By contrast, low-resolution or linear-mode MALDI spectra exhibit worse m/z resolutions but often may provide significantly better signal-to-noise ratios. Detected masses, therefore, appear as broadened peaks rather than an ensemble of individual isotopomers. The maximum of the broadened peaks corresponds to the molecular weight of the species rather than the monoisotopic mass. In such cases, the fractional mass cannot be used. Instead, the remainder of the Kendrick mass ("RKM") provides information related to fragments other than the IUPAC mass of the repeat unit. For the oligomers described in this work, the remainder mass corresponds to the mass of the chain-ends.

Remainder Kendrick plots are constructed by plotting the RKM as a function of the measured m/z value. Species with identical chain-ends (and adducting ions) align horizontally in the remainder Kendrick plots at a single remainder value.

For species with masses greater than 2 kDa, the difference between a monoisotopic mass and the molecular weight of a species may become non-trivial. Because the peak maxima in low-resolution MALDI spectra correspond to the molecular weight rather than the monoisotopic mass, the difference between the two values must be considered. In the Kendrick remainder plots illustrated in the figures, horizontally aligned species may drift over a 6 kDa range by as much as 4 Da.

Kendrick mass-analysis of deconstructed poly(DCPD-co-DHF) samples was performed following a literature method and calculated using the following equation (3):

$$KM = \frac{m}{z} * Z\frac{x}{R} \quad (3)$$

where m/z is the measured MALDI data (Daltons), R is the exact mass of the repeat unit (132.0939 Daltons), Z is the multiplication factor accounting for multiple charges (Z=1), and x is the separating factor (x=132) that increases the separation between different fragments providing improved visualization of the various species. The RKM is particularly useful for differentiating various fragments in low resolution MALDI data and is calculated using the following equation (4):

$$RKM = \text{remainder}\left(\frac{KM}{R}\right) \quad (4)$$

which separates the fragments with similar end-groups and provides insight into the identity of each end-group. Due to the low resolution of the MALDI traces and the overlapping masses of possible end-groups, the identity of the end-groups could not be ascertained.

III. Acid-Triggered Deconstruction of Poly(DCPD-co-DHF) Copolymer Thermosets.

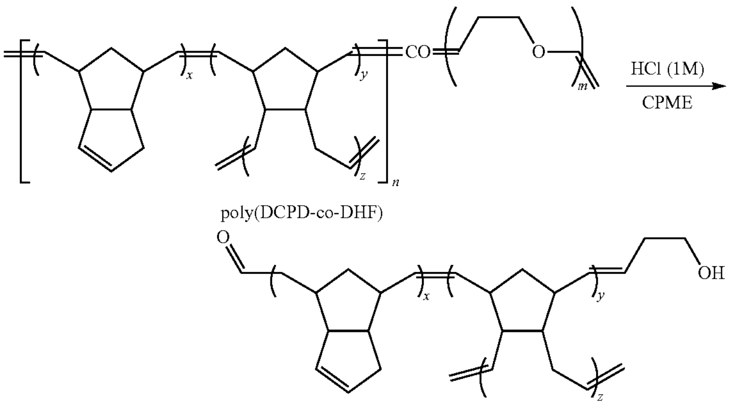

poly(DCPD-co-DHF)

oligomeric units

Figure 2:
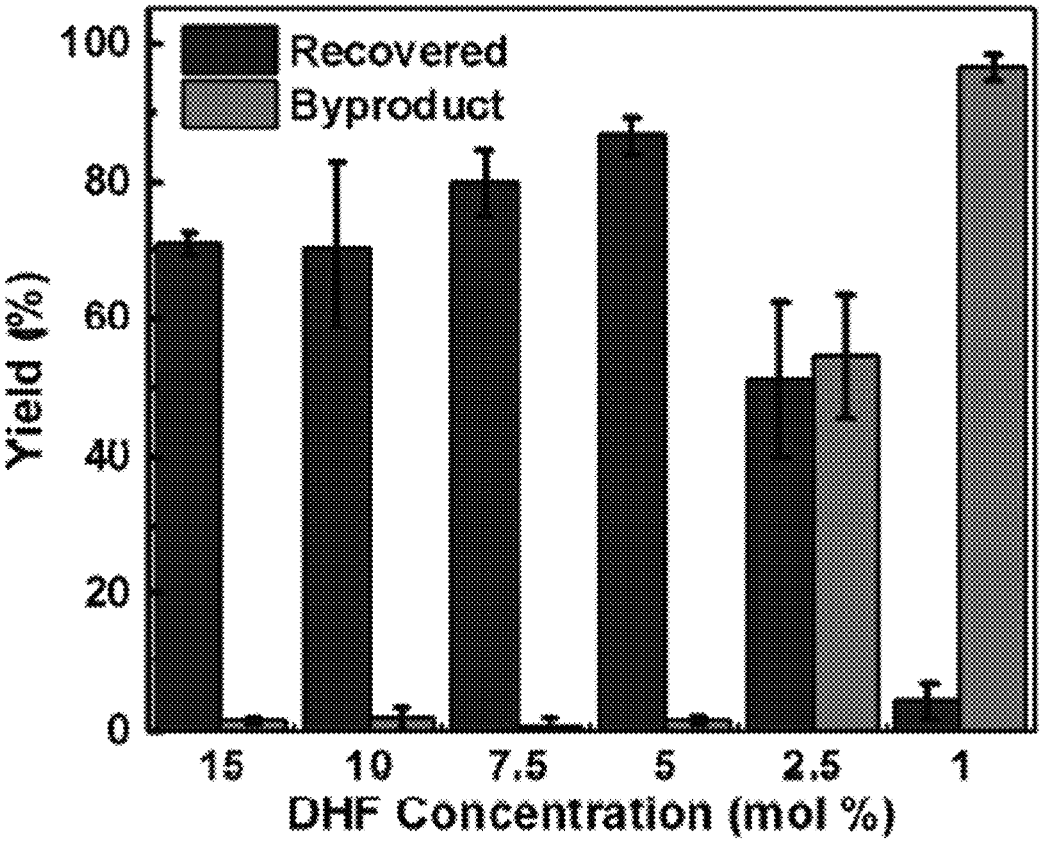
FIG. 2 illustrates quantification of byproduct yield via gravimetric analysis after deconstructing copolymers of thermoset resin compositions.
Figure 3:
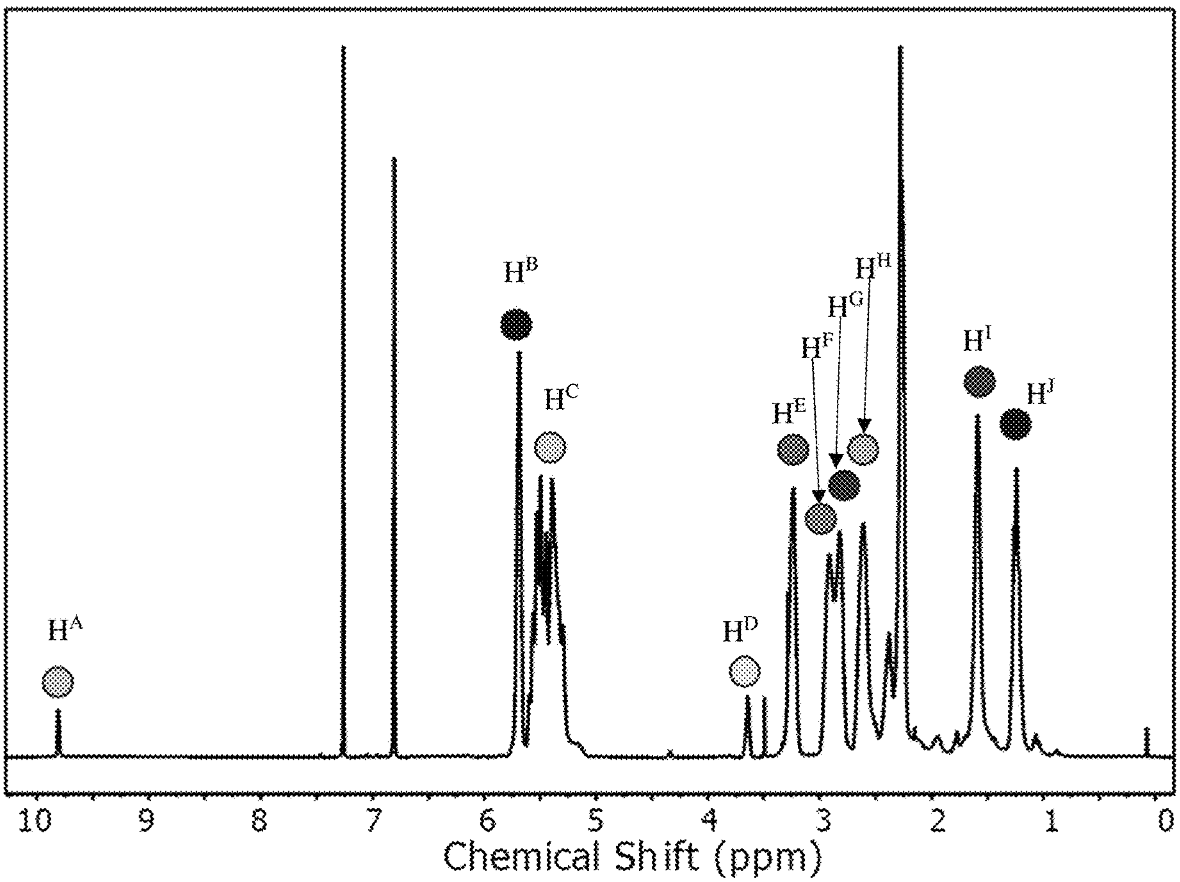
FIG. 3 illustrates a representative solution-phase $^{1}$H NMR spectrum ($CDCl_3$, 500 MHz) of a sample of deconstructed p(DCPD-co-DHF) with 10 mol % DHF incorporation.

A sample of poly(DCPD-co-DHF) of approximately ~400 milligrams, with 5 mol %, 10 mol %, or 15 mol % of DHF incorporated, was immersed in a 10 mL solution of 1 M HCl in cyclopentyl methyl ether ("CPME"). After 18 hours, the solution was filtered to remove any insoluble byproducts, which were subsequently dried at 80° C. via high-vacuum and weighed to determine the mass of residual products. The remaining soluble products were neutralized using sodium bicarbonate until bubbling ceased, and filtered to remove sodium bicarbonate. Each solution was then precipitated into 100 mL of methanol, collected, and dried under high-vacuum for 48 hours, and weighed. FIG. 2 illustrates the quantification of byproduct yield as determined by gravimetric analysis. FIGS. 3-9 illustrate NMR spectra of the deconstructed product oligomeric units. FIG. 3 illustrates a $^{1}H$ NMR spectra with deconstructed product oligomeric units with protons assigned corresponding to the following structure:

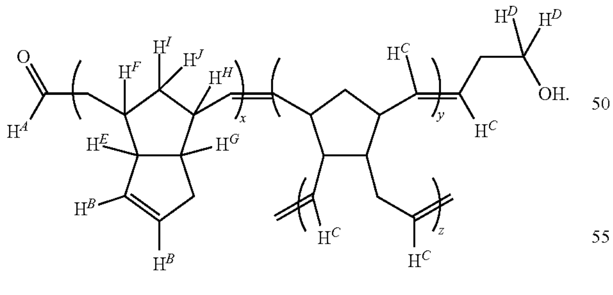

oligomeric units

As shown below in Table 1, with an increasing mol % of DHF incorporated into the poly(DCPD-co-DHF), an increasing amount of aldehyde ($H^A$) and alcohol ($C(H^D)_2$—OH) are present in the deconstructed oligomeric units relative to terminal olefins.

TABLE 1

| [DHF] (mol %) | [Aldehyde]:[Olefin] | [$CH_2$—OH]:[Olefin] |
|---|---|---|
| 5 | 1:28.75 | 1:20.28 |
| 10 | 1:20.52 | 1:15.95 |
| 15 | 1:16.64 | 1:12.15 |

Figure 4:
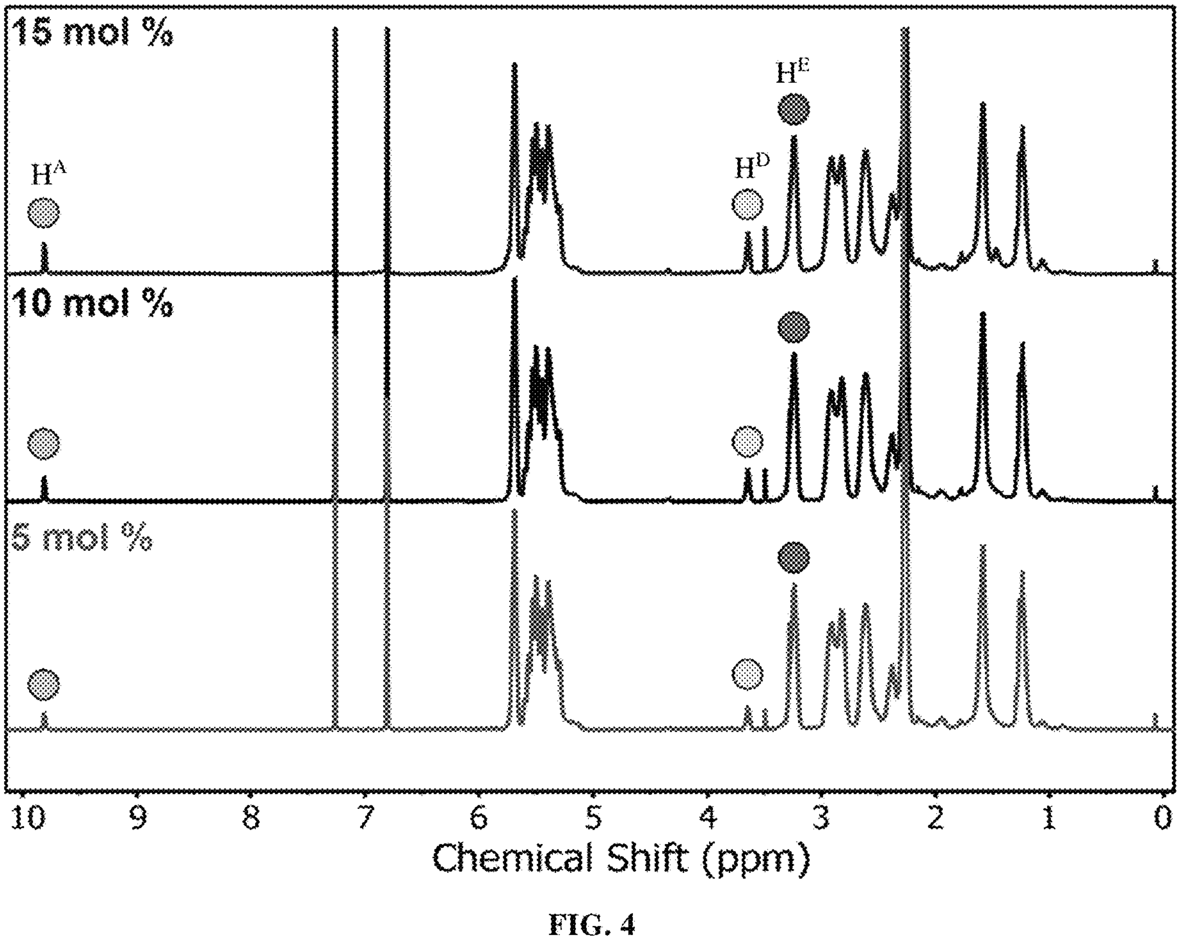
FIG. 4 illustrates $^{1}$H NMR spectra ($CDCl_3$, 500 MHz) of samples of deconstructed p(DCPD-co-DHF) with 15 mol % (top spectrum), 10 mol % (middle spectrum), and 5 mol % (bottom spectrum) DHF incorporation.
Figure 5:
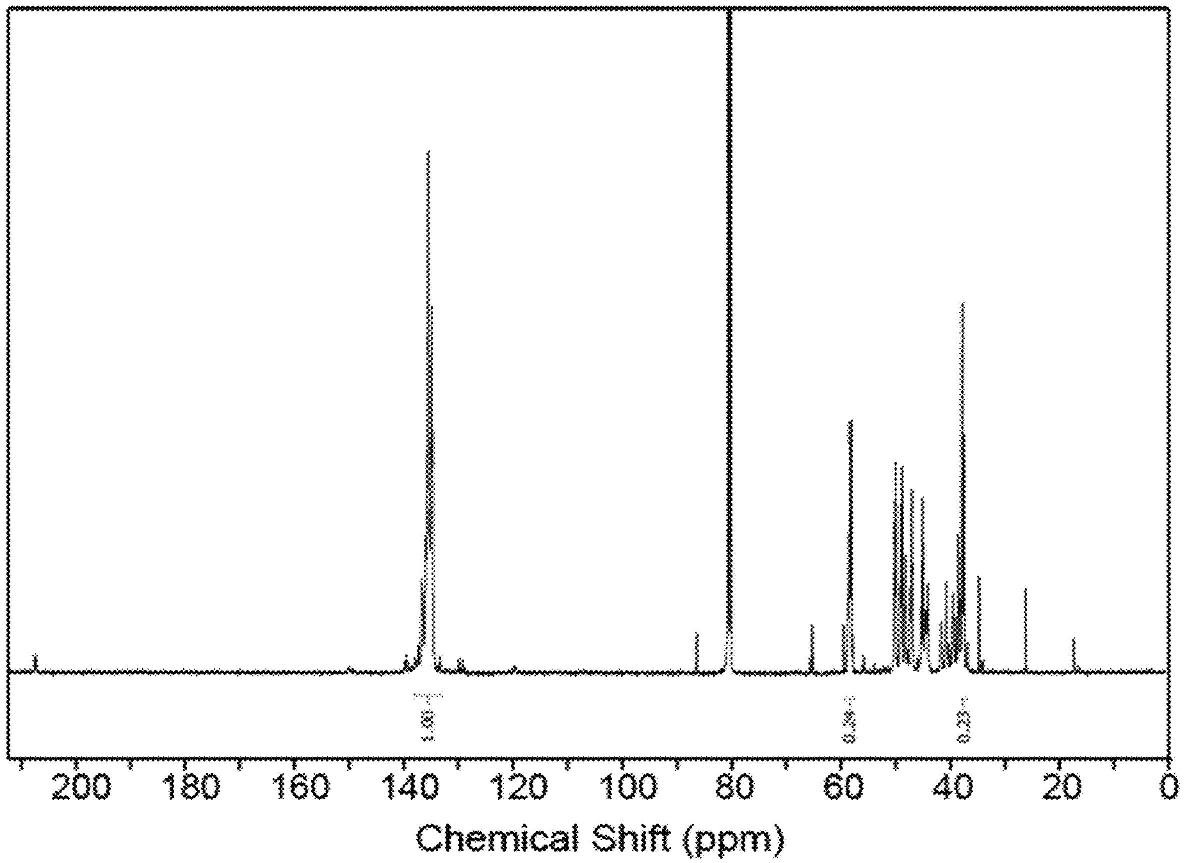
FIG. 5 illustrates a representative solution-phase $^{13}$C NMR spectrum ($CDCl_3$, 500 MHz) of deconstructed p(DCPD-co-DHF) with 5 mol % DHF incorporation.
Figure 6:
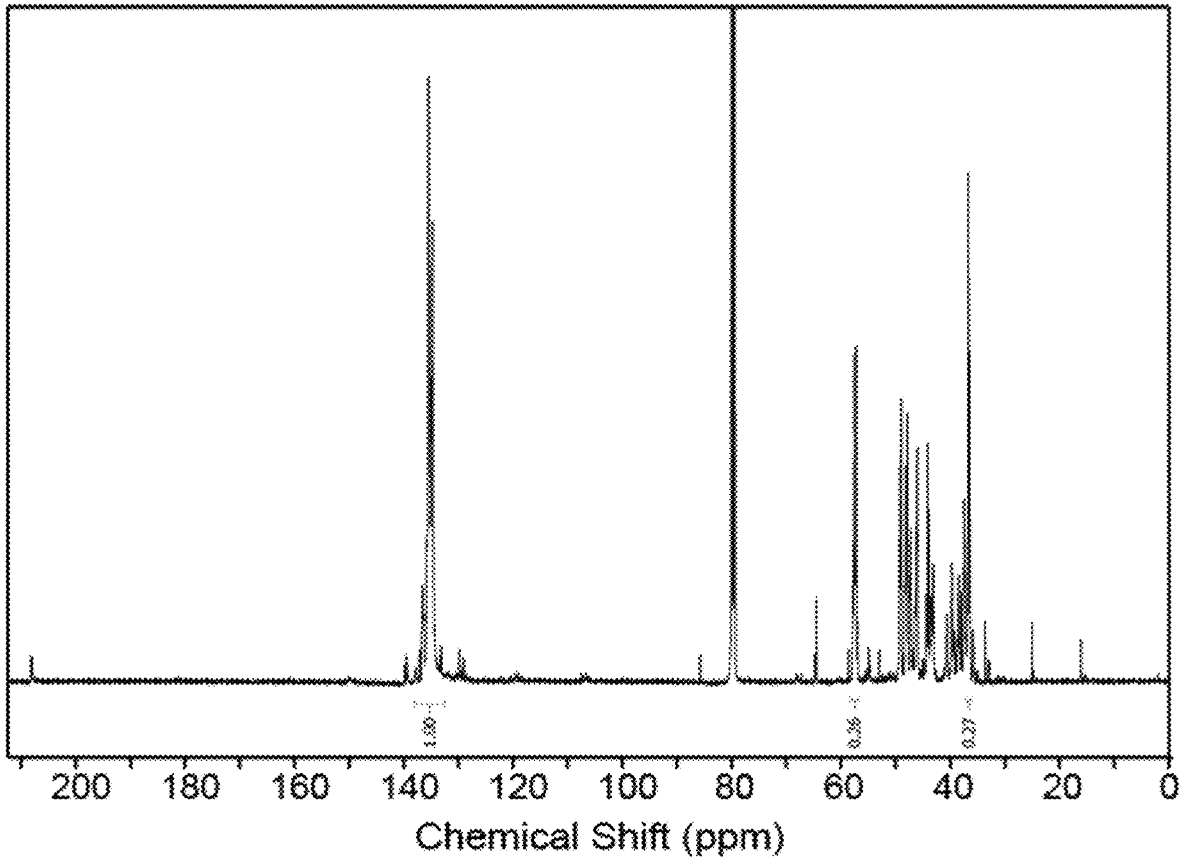
FIG. 6 illustrates a representative solution-phase $^{13}$C NMR spectrum ($CDCl_3$, 500 MHz) of deconstructed p(DCPD-co-DHF) with 10 mol % DHF incorporation.
Figure 7:
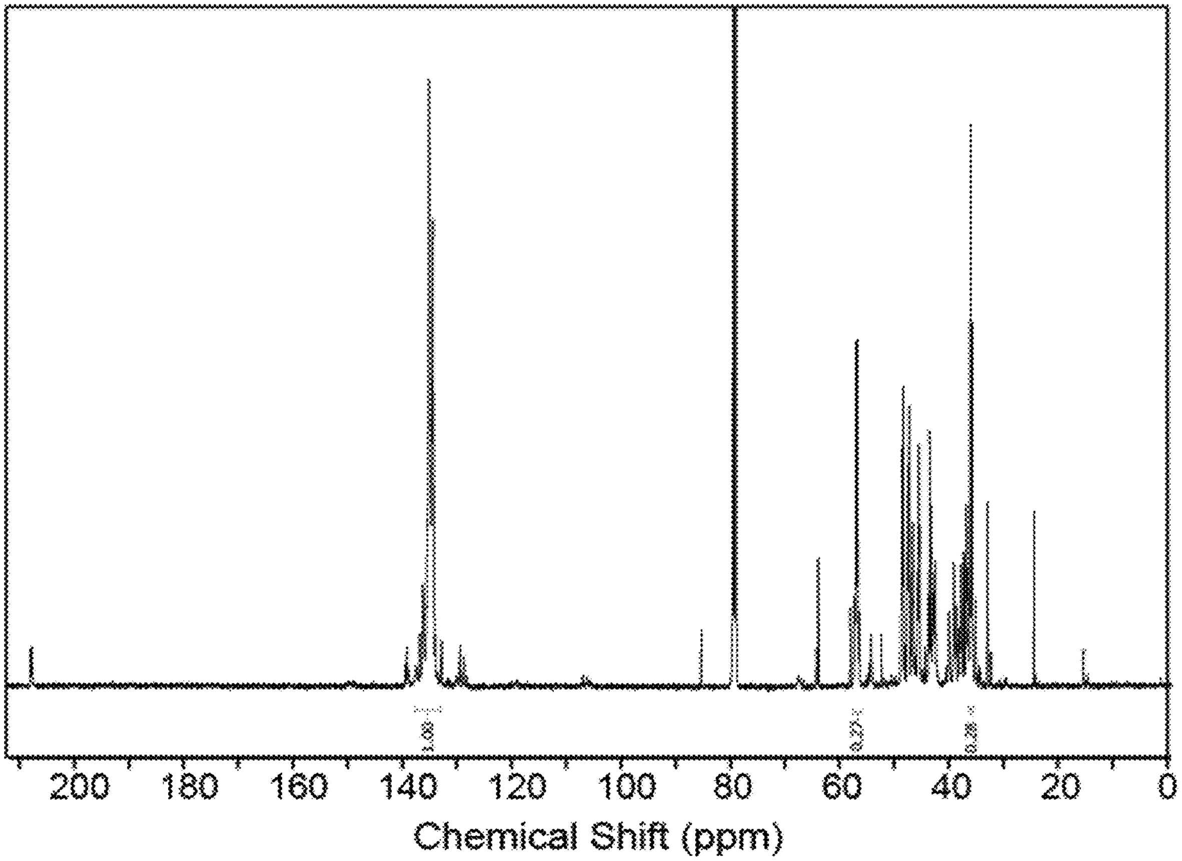
FIG. 7 illustrates a representative solution-phase $^{13}$C NMR spectrum ($CDCl_3$, 500 MHz) of deconstructed p(DCPD-co-DHF) with 15 mol % DHF incorporation.
Figure 8:
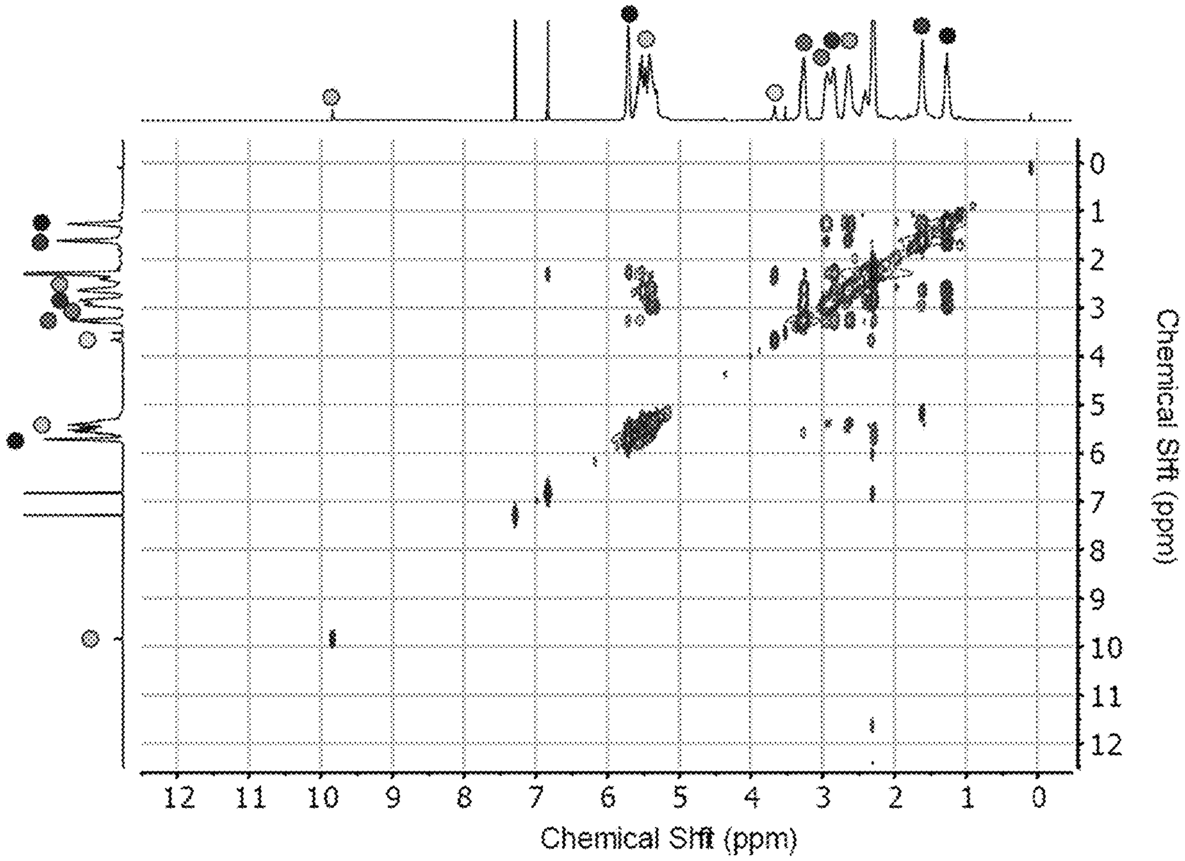
FIG. 8 illustrates a representative solution-phase $^{1}$H NMR correlated spectroscopy ("COSY") spectrum ($CDCl_3$, 500 MHz) of deconstructed p(DCPD-co-DHF) with 15 mol % DHF incorporation.
Figure 9:
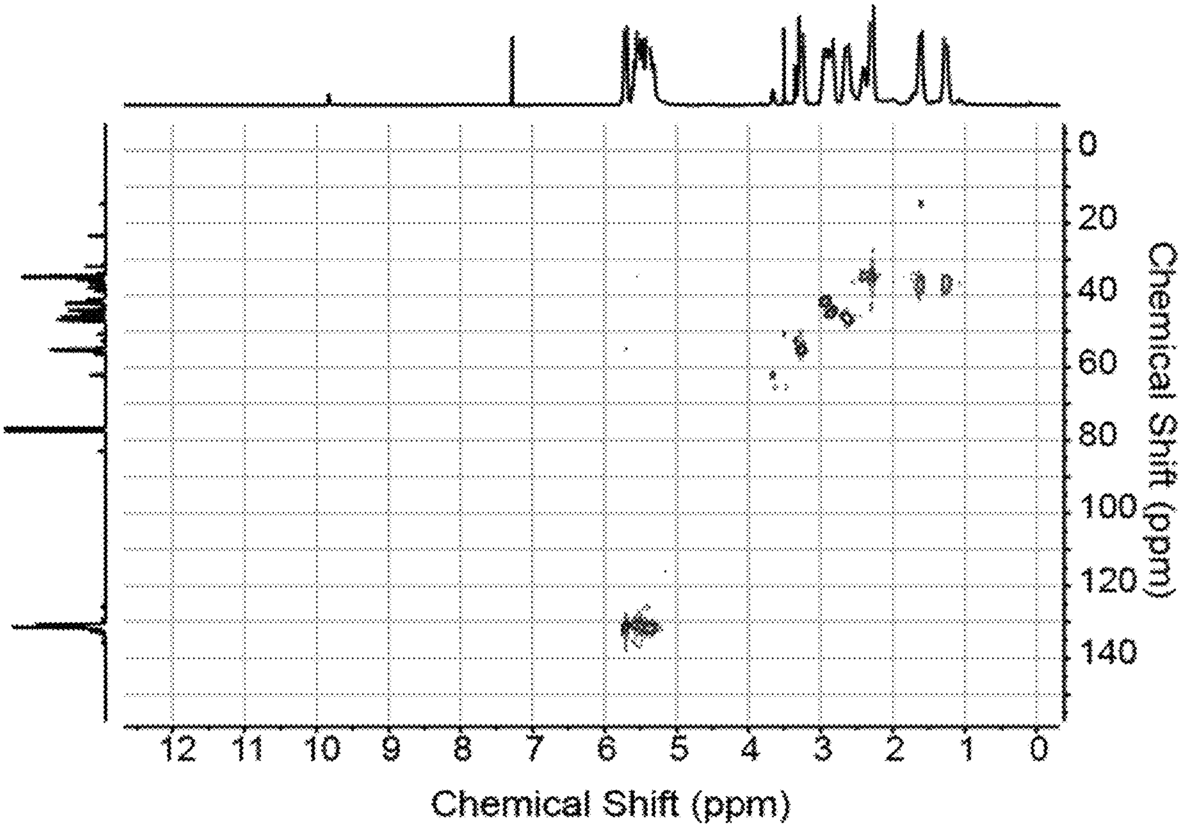
FIG. 9 illustrates a representative solution-phase Heteronuclear Single Quantum Coherence ("HSQC") spectrum ($CDCl_3$, 500 MHz) of deconstructed p(DCPD-co-DHF) with 10 mol % DHF incorporation.
Figure 10:
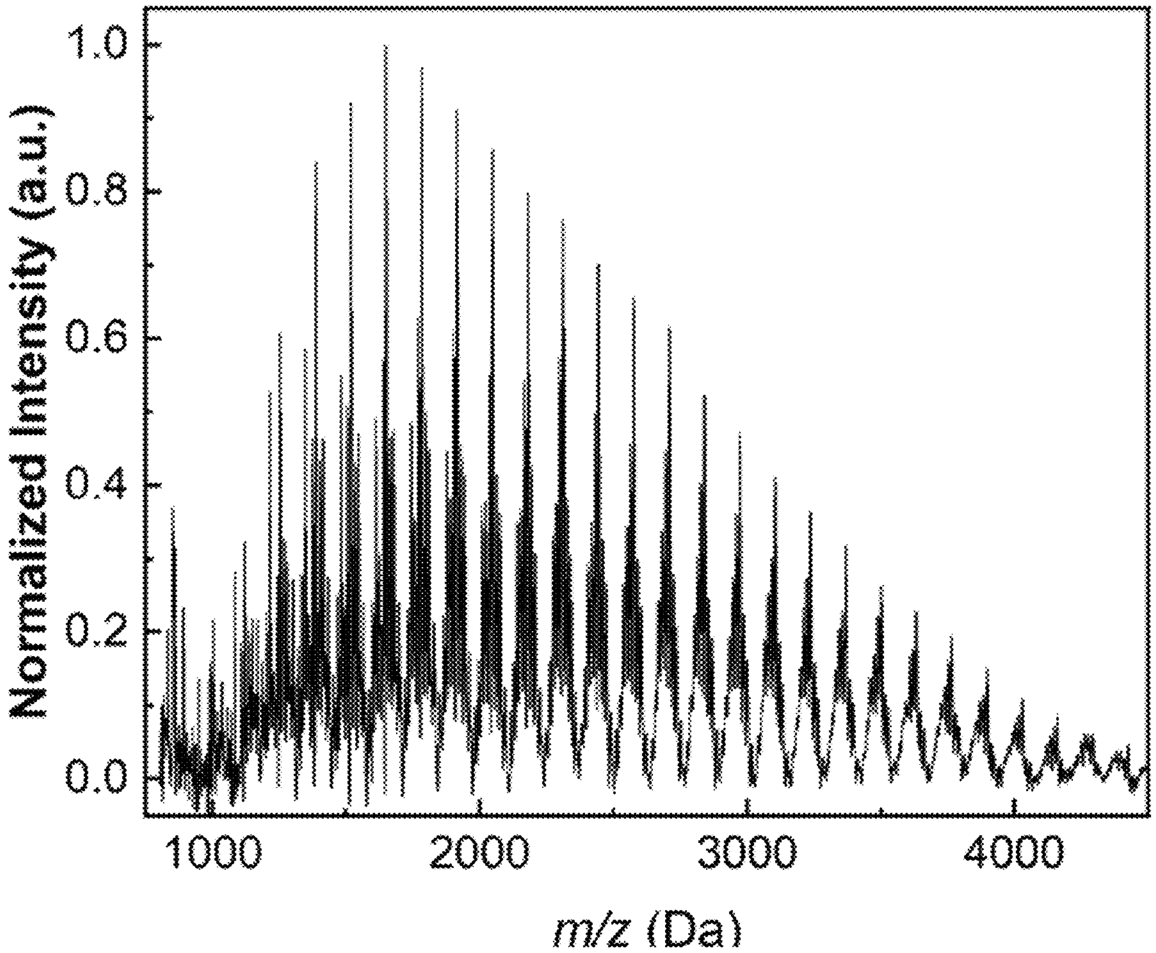
FIG. 10 illustrates a MALDI spectrum of deconstructed p(DCPD-co-DHF) with 5 mol % DHF incorporation, using DCTB as the matrix with AgTFA.
Figure 11:
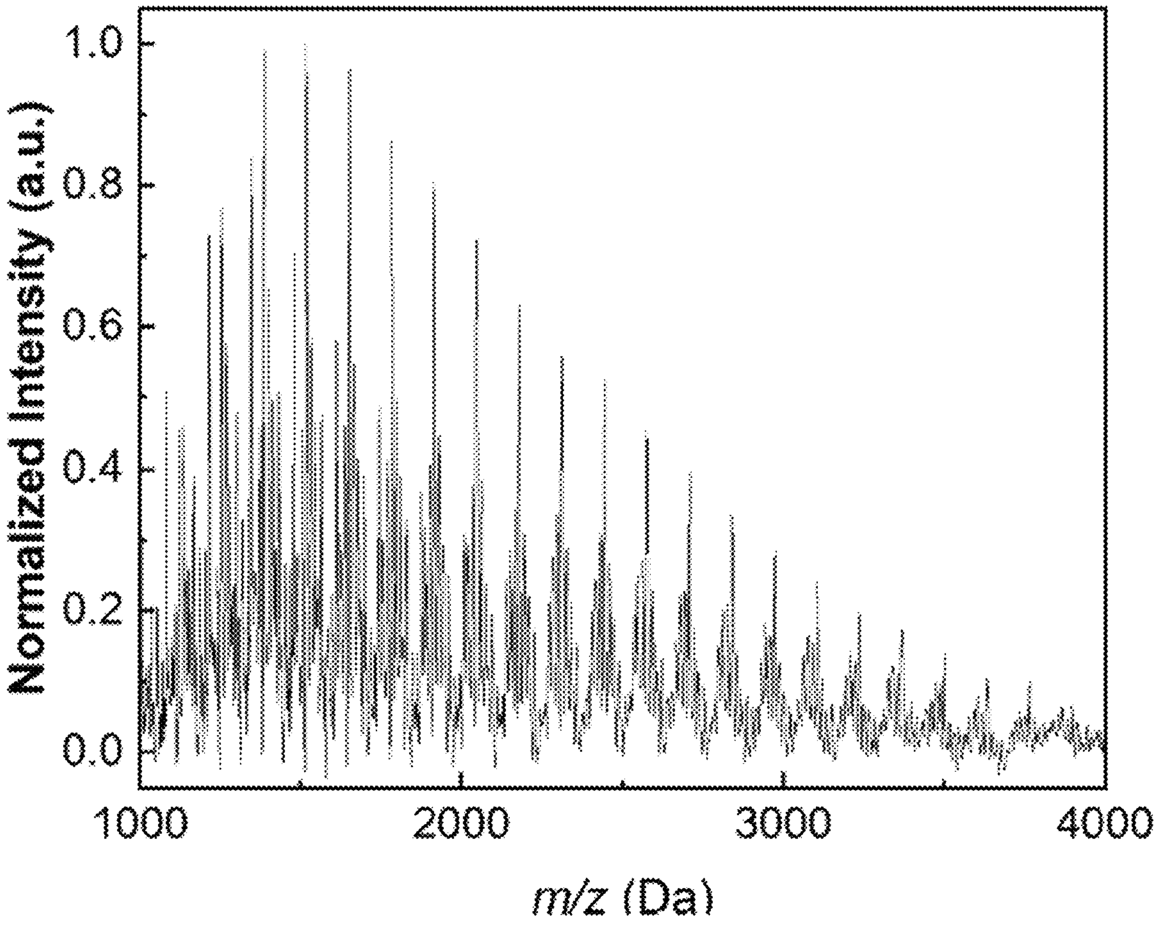
FIG. 11 illustrates a MALDI spectrum of deconstructed p(DCPD-co-DHF) with 10 mol % DHF incorporation, using DCTB as the matrix with AgTFA.
Figure 12:
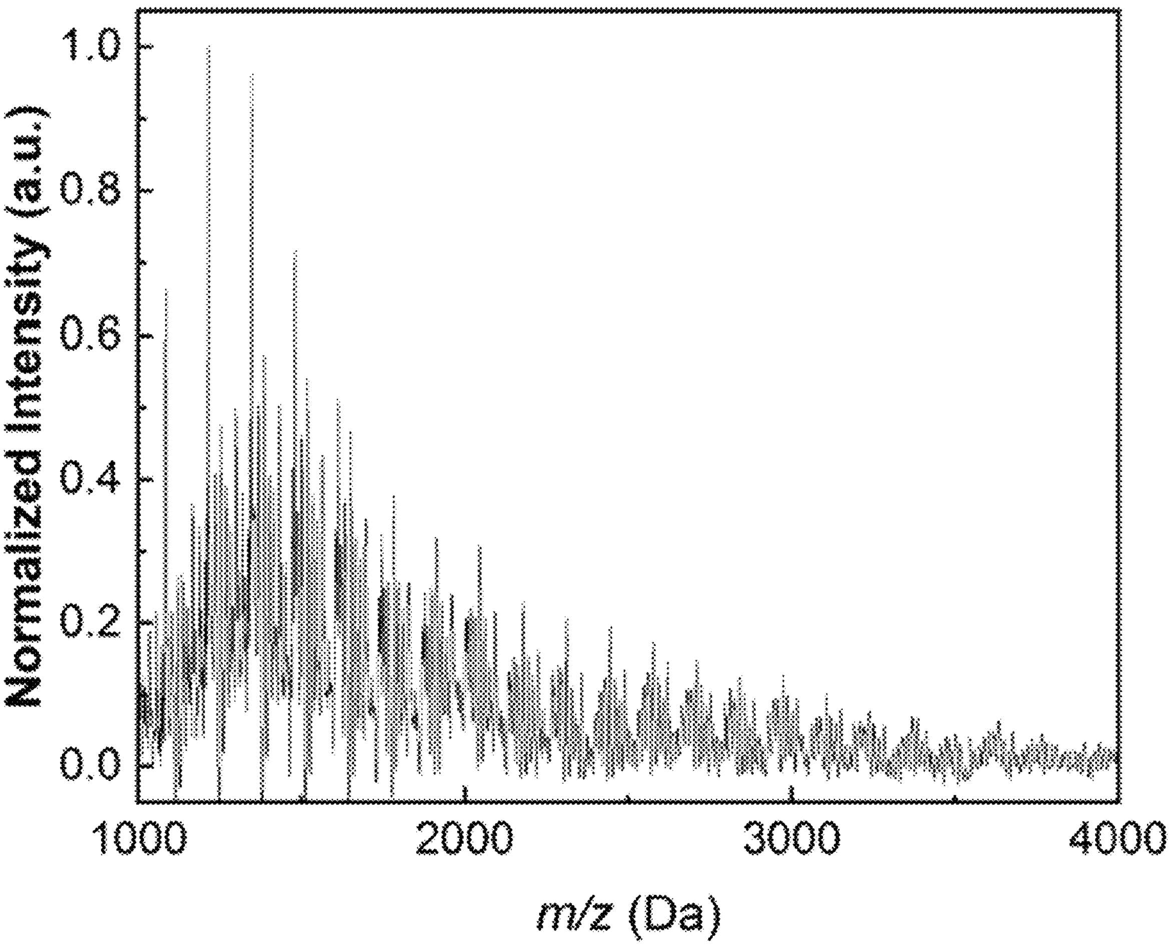
FIG. 12 illustrates a MALDI spectrum of deconstructed p(DCPD-co-DHF) with 15 mol % DHF incorporation, using DCTB as the matrix with AgTFA.

FIG. 4 illustrates $^{1}H$ NMR spectra of oligomeric unit products resulting from deconstruction of poly(DCPD-co-DHF) incorporating 5 mol %, 10 mol %, or 15 mol % DHF. FIGS. 5-7 illustrate $^{13}C$ NMR spectra of oligomeric unit products resulting from deconstruction of poly(DCPD-co-DHF) incorporating 5 mol %, 10 mol %, and 15 mol % DHF, respectively. FIG. 8 illustrates a COSY spectrum, and FIG. 9 illustrates a HSQC spectrum. FIGS. 10-12 illustrates MALDI-TOF spectra of oligomeric unit products resulting from deconstruction of poly(DCPD-co-DHF) incorporating 5 mol %, 10 mol %, and 15 mol % DHF, respectively. Table 2 provides the molecular weights of deconstructed products determined via MALDI as illustrated in FIGS. 10-12.

TABLE 2

| DHF (mol %) | $M_n$ (kg · $mol^{-1}$) | $M_w$ (kg · $mol^{-1}$) | Dispersity |
|---|---|---|---|
| 5 | 2.3 | 2.8 | 1.2 |
| 10 | 2.0 | 2.3 | 1.2 |
| 15 | 2.0 | 2.3 | 1.2 |

Figure 13:
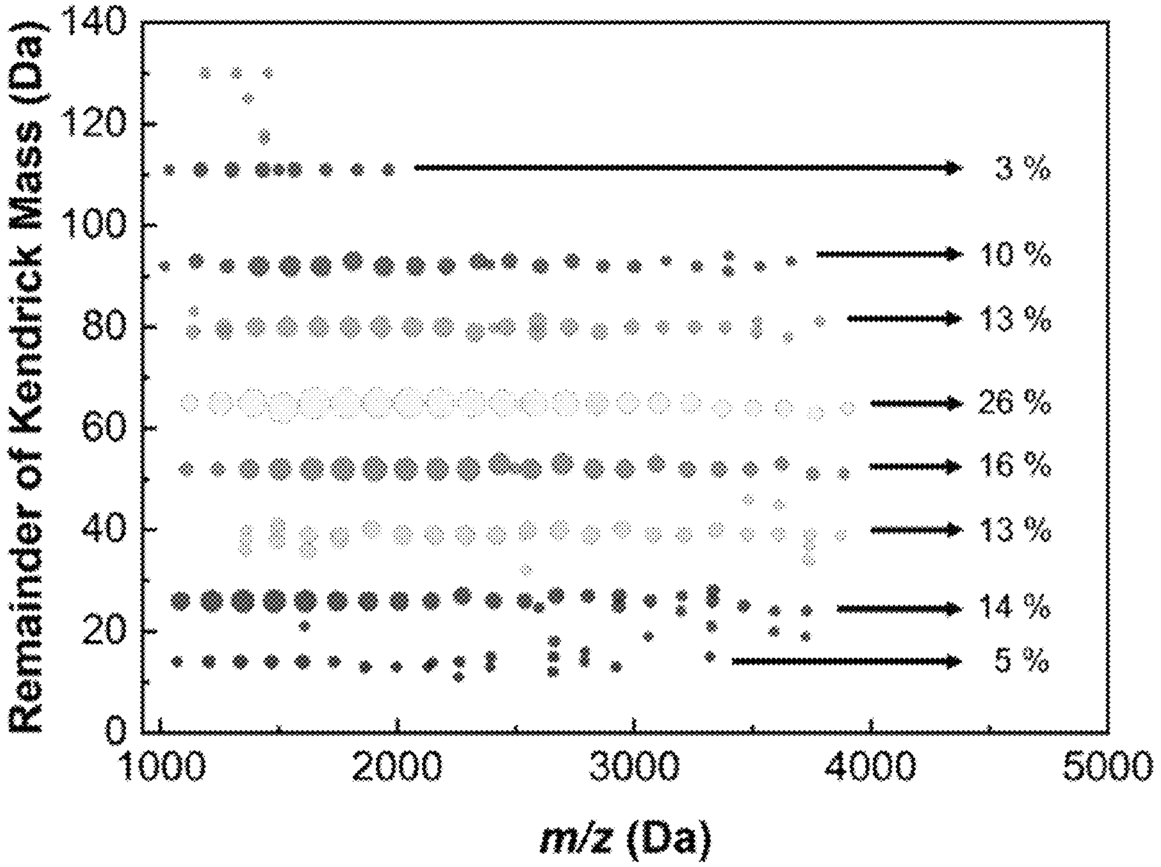
FIG. 13 illustrates the RKM of deconstructed p(DCPD-co-DHF) with 5 mol % DHF incorporation, computed with R=132.0939, x=132, and Z=1.
Figure 14:
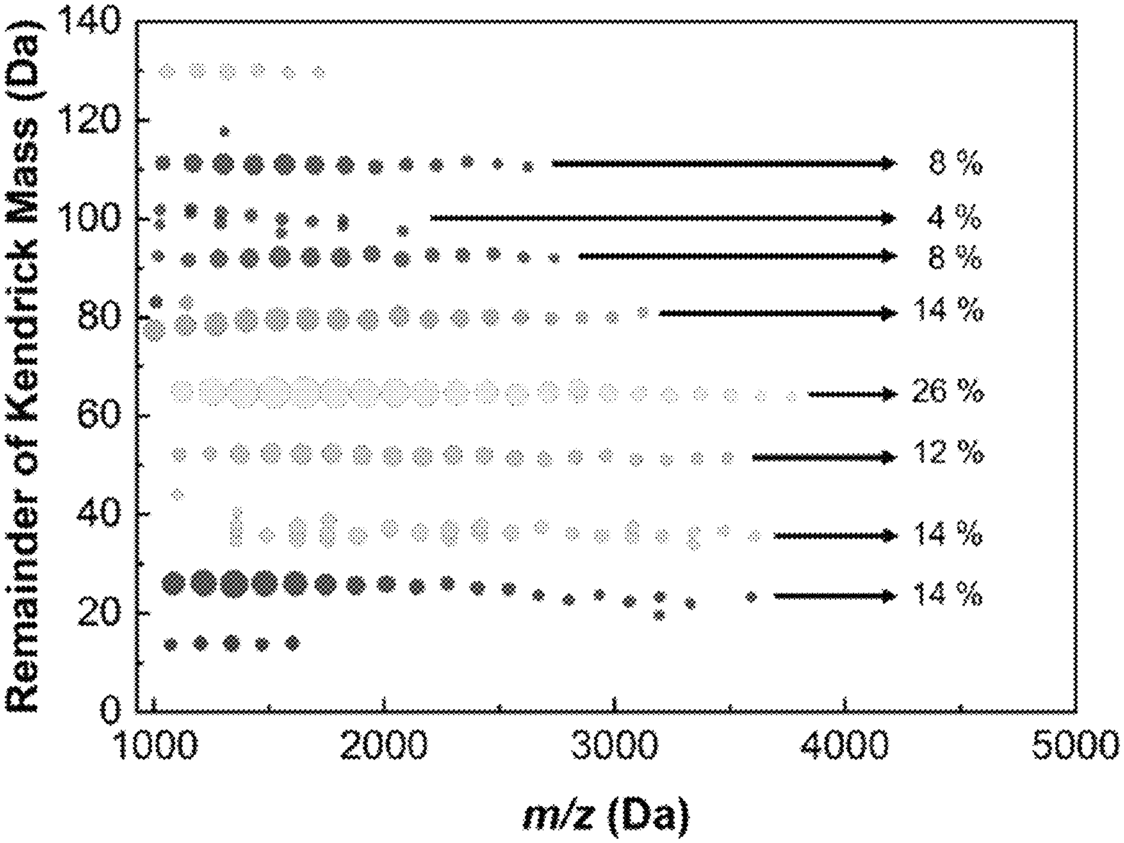
FIG. 14 illustrates the RKM of deconstructed p(DCPD-co-DHF) with 10 mol % DHF incorporation, computed with R=132.0939, x=132, and Z=1.
Figure 15:
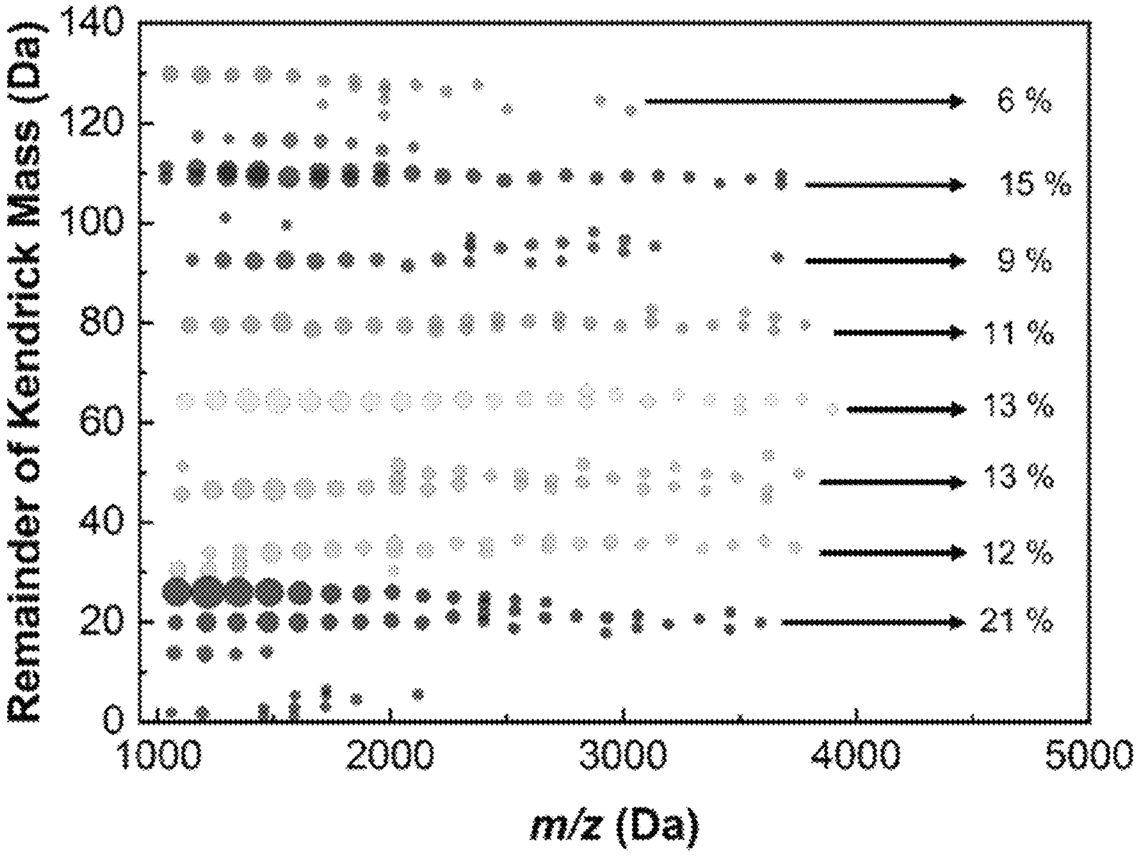
FIG. 15 illustrates the RKM of deconstructed p(DCPD-co-DHF) with 15 mol % DHF incorporation, computed with R=132.0939, x=132, and Z=1.
Figure 16:
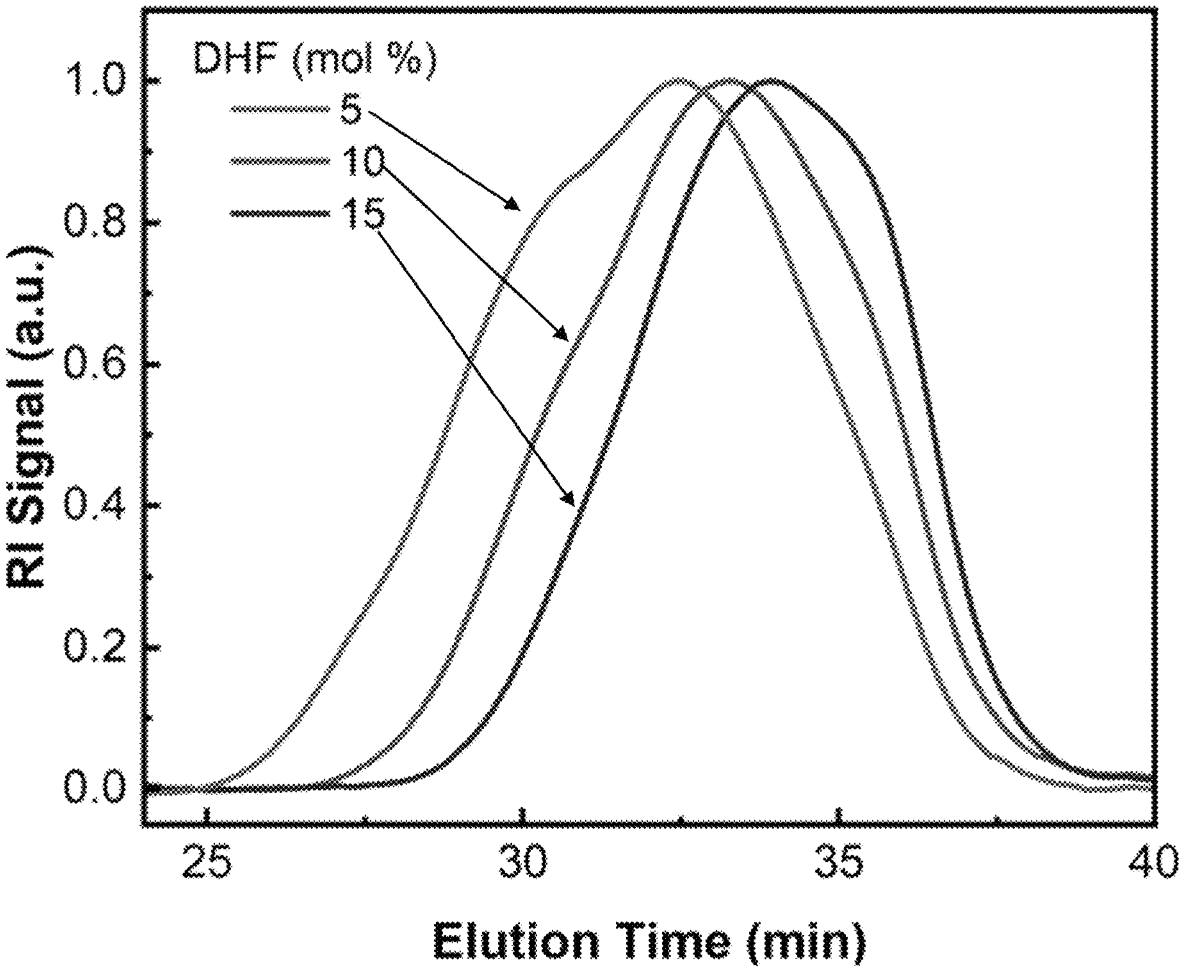
FIG. 16 illustrates representative size exclusion chromatograms of deconstructed p(DCPD-co-DHF) with 5 mol %, 10 mol %, and 15 mol % DHF incorporation.

FIGS. 13-15 illustrates RKM of oligomeric unit products resulting from deconstruction of poly(DCPD-co-DHF) incorporating 5 mol %, 10 mol %, and 15 mol % DHF, respectively. FIG. 16 illustrates representative size exclusion chromatograms of deconstructed p(DCPD-co-DHF) with 5 mol %, 10 mol %, and 15 mol % DHF incorporation. Table 3 provides the molecular weights of deconstructed products determined via size exclusion chromatography as illustrated in FIG. 16.

TABLE 3

| DHF (mol %) | $M_n$ (kg · mol$^{-1}$) | $M_w$ (kg · mol$^{-1}$) | Dispersity |
|---|---|---|---|
| 5 | 6.5 ± 0.1 | 20.9 ± 0.6 | 3.2 ± 0.1 |
| 10 | 4.4 ± 0.1 | 11.7 ± 1.5 | 2.7 ± 0.0 |
| 15 | 3.3 ± 0.5 | 7.0 ± 0.5 | 2.1 ± 0.1 |

Table 4 below provides Kendrick mass defect analysis for deconstructed oligomeric unit products of poly(DCPD-co-DHF) including 5 mol % DHF incorporated. The end-group identity legend for Tables 4-6 are as follows:

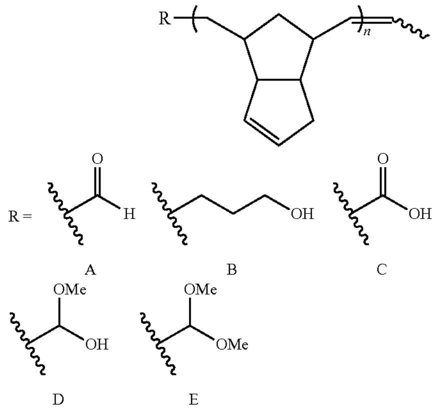

A B C D E

TABLE 4

| End-group Identity | RKM (m/z) | RKM + x | RKM + 2x | Nominal Mass | Relative Abundance (%) |
|---|---|---|---|---|---|
| 2A + 2B* | 14 | 146 | 278 | 278 | 5.1 |
| 2A + 2B | 25 | 157 | 289 | 289 | 14.2 |
| A + 2B + C | 39 | 171 | 303 | 303 | 13.2 |
| 2D + 2B | 52 | 184 | 316 | 316 | 16.2 |
| A + B | 65 | 197 | 329 | 197 | 25.9 |
| B + C | 80 | 212 | 344 | 212 | 12.6 |
| B + D | 92 | 224 | 356 | 224 | 10.0 |

*Contains one ENB instead of DCPD unit.

Table 5 below provides Kendrick mass defect analysis for deconstructed oligomeric unit products of poly(DCPD-co-DHF) including 10 mol % DHF incorporated.

TABLE 5

| End-group Identity | RKM (m/z) | RKM + x | RKM + 2x | Nominal Mass | Relative Abundance (%)* |
|---|---|---|---|---|---|
| 2A + 2B | 25 | 157 | 289 | 289 | 14.2 |
| A + 2B + C | 39 | 171 | 303 | 303 | 14.0 |
| 2D + 2B | 52 | 184 | 316 | 316 | 11.7 |
| A + B | 65 | 197 | 329 | 197 | 25.7 |
| B + C | 80 | 212 | 344 | 212 | 14.4 |
| B + D | 92 | 224 | 356 | 224 | 8.3 |
| B + E | 111 | 243 | 375 | 243 | 7.8 |

*Does not include fragments below 5% Relative Abundance.

Table 6 below provides Kendrick mass defect analysis for deconstructed oligomeric unit products of poly(DCPD-co-DHF) including 15 mol % DHF incorporated.

TABLE 6

| End-group Identity | RKM (m/z) | RKM + x | RKM + 2x | Nominal Mass | Relative Abundance (%) |
|---|---|---|---|---|---|
| 2A + 2B | 24 | 157 | 289 | 289 | 20.8 |
| A + 2B + C | 34 | 171 | 303 | 303 | 11.9 |
| 2D + 2B | 48 | 184 | 316 | 316 | 13.6 |
| A + B | 64 | 197 | 329 | 197 | 12.8 |
| B + C | 80 | 212 | 344 | 212 | 11.0 |
| B + D | 94 | 224 | 356 | 224 | 8.8 |
| B + E | 109 | 243 | 375 | 243 | 15.3 |
| 2E | 127 | 259 | 391 | 259 | 6.1 |

IV. Functionalization ("Upcycling") of Oligomeric Units (o(DCPD).

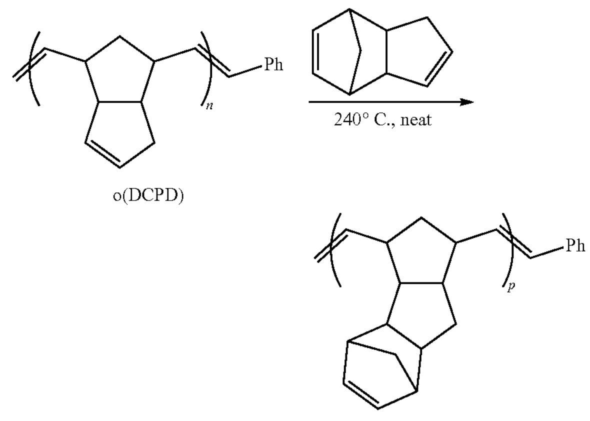

o(DCPD)

oligomeric macromonomers

Figure 17:
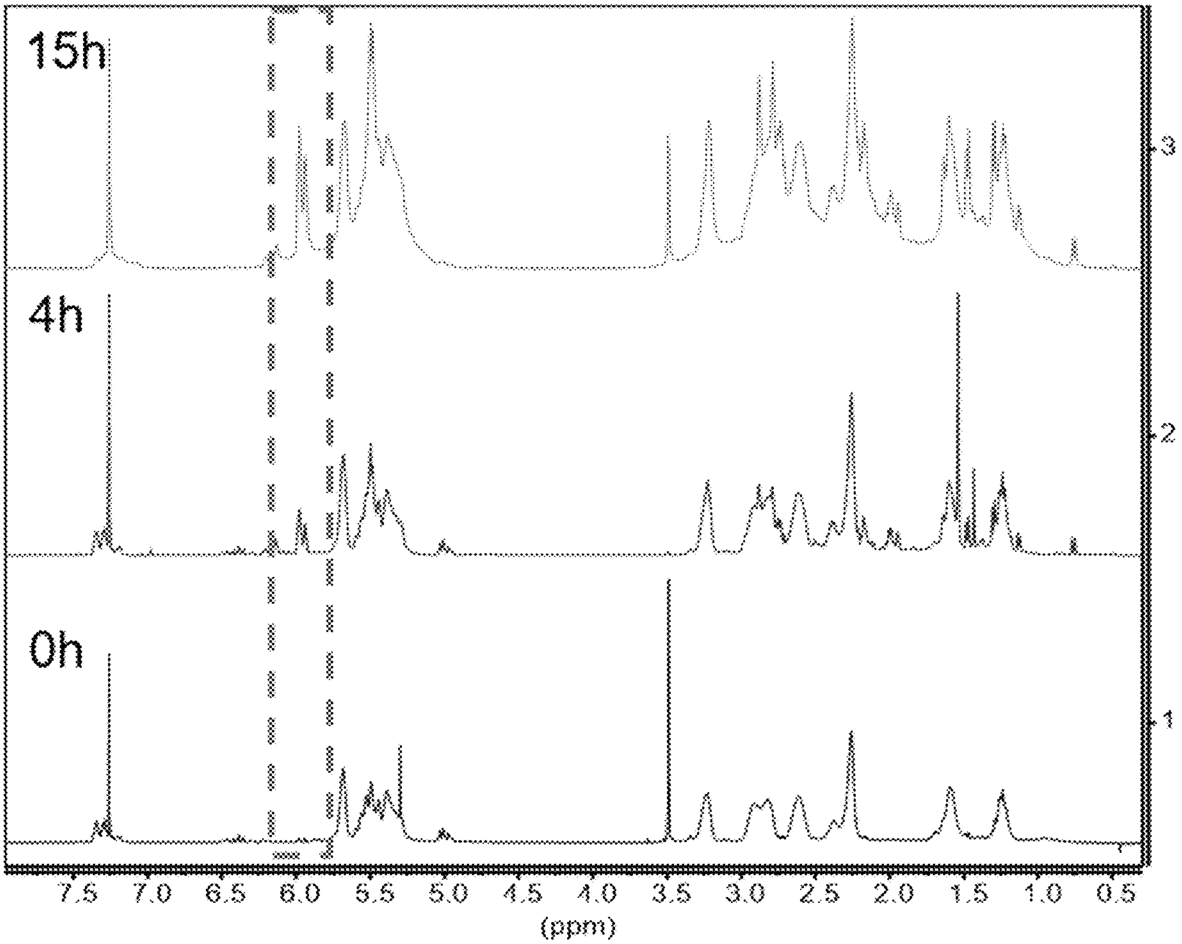
FIG. 17 illustrates 1H NMR spectra ($CDCl_3$, 500 MHz) of reaction mixtures for the preparation of oligomeric macromonomers over the course of reaction time from initial reaction mixture (bottom), at 4 hours (middle), and 15 hours (top)
Figure 18:
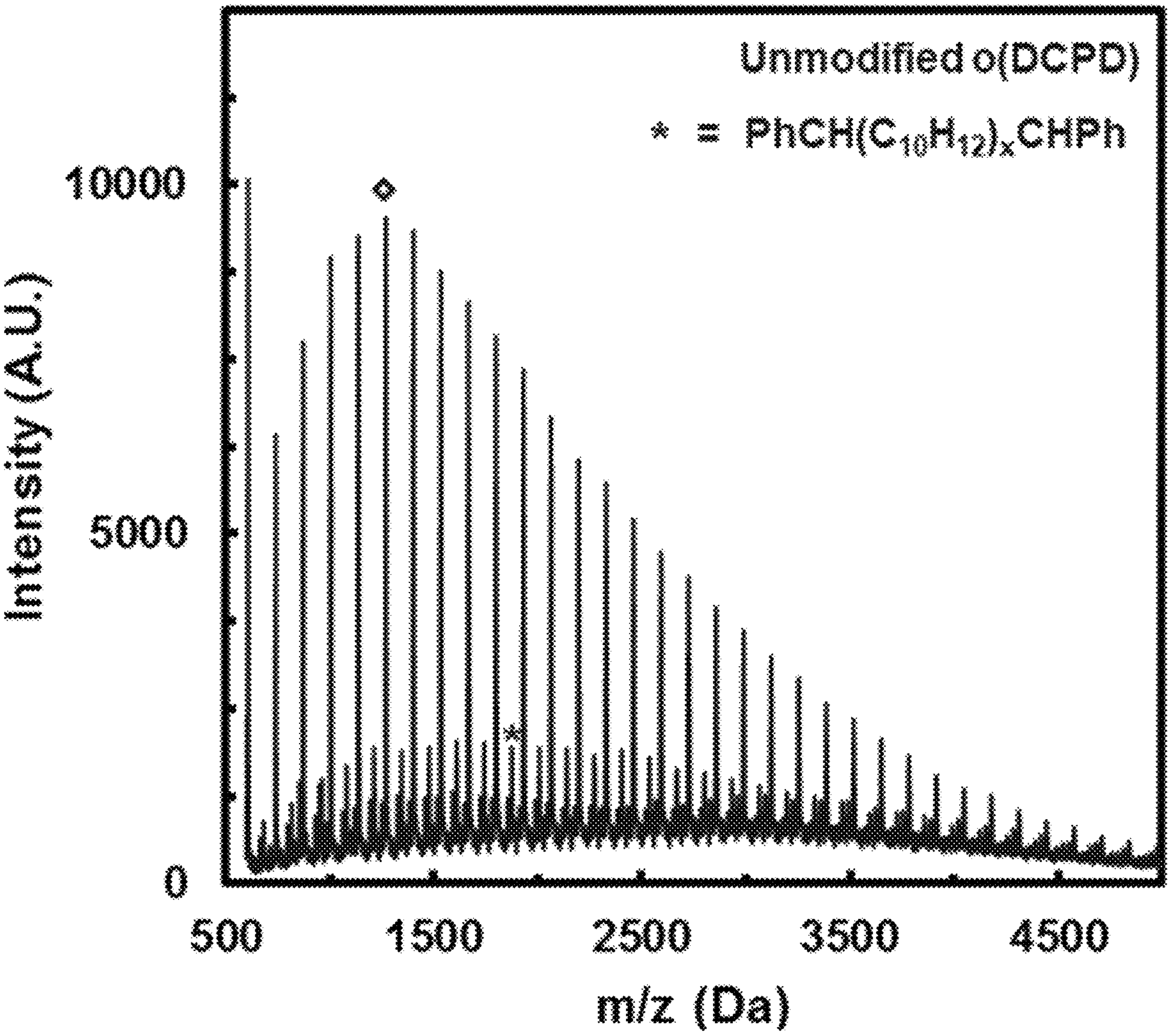
FIG. 18 illustrates a MALDI spectrum of oligomeric starting material submitted to reaction with neat dicyclopentadiene to produce oligomeric macromonomers.
Figure 19:
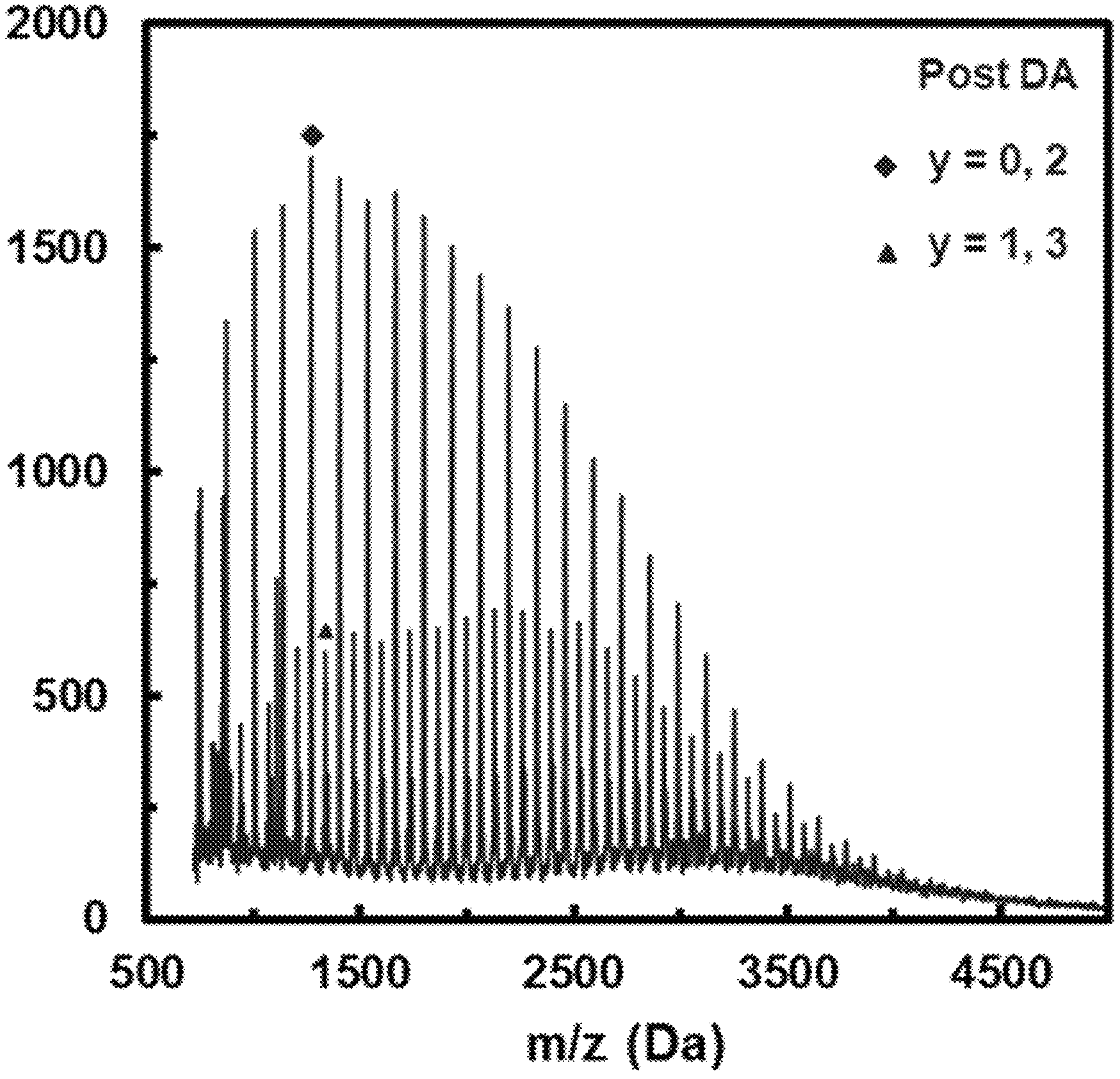
FIG. 19 illustrates a MALDI spectrum of oligomeric macromonomer products.

At high temperature, a neat mixture of DCPD and o(DCPD) provided functionalized oligomers with added mass. The functionalized oligomers, or oligomeric macromonomers, include norbornenyl-like fragments. The added mass could be clearly observed in the MALDI spectrum illustrated in FIG. 1, and corresponded to the molecular mass of cyclopentadiene, which is the active intermediate formed from DCPD in situ, DCPD being a dimer of cyclopentadiene. The degree of functionalization may be modulated by hotter reaction temperatures over longer periods of time, and may occur more easily on larger scales, in high-temperature autoclaves to provide oligomeric macromonomers in large quantities. FIG. 17 illustrates $^1$H NMR spectra of reaction mixtures for production of oligomeric macromonomers at reaction starting time (0 h), after 4 hours, and after 15 hours. Table 7 below demonstrates the recovered solid and the ratio of norbornenyl-like fragments in the oligomeric units relative to the number of unreacted alkenes not converted to norbornenyl-like fragments. According to Table 7, as the reaction duration increases, the ratio of norbornenyl-like fragments to the number of unreacted alkenes increases. FIG. 18 illustrates a MALDI spectrum of oligomeric starting material submitted to reaction with neat dicyclopentadiene to produce oligomeric macromonomers, and FIG. 19 illustrates a MALDI spectrum of oligomeric macromonomer products.

TABLE 7

| | | |
|---|---|---|
| Reaction time (hours) | 4 | 15 |
| Recovered solid (%) | −16.4 | +14.1 |
| Norbornenyl/Alkene | 1/11.6 | 1/6.4 |

V. FROMP of Oligomeric Macromonomers with Functionalized Cycloalkene (DCPD) to Regenerate Thermoset.

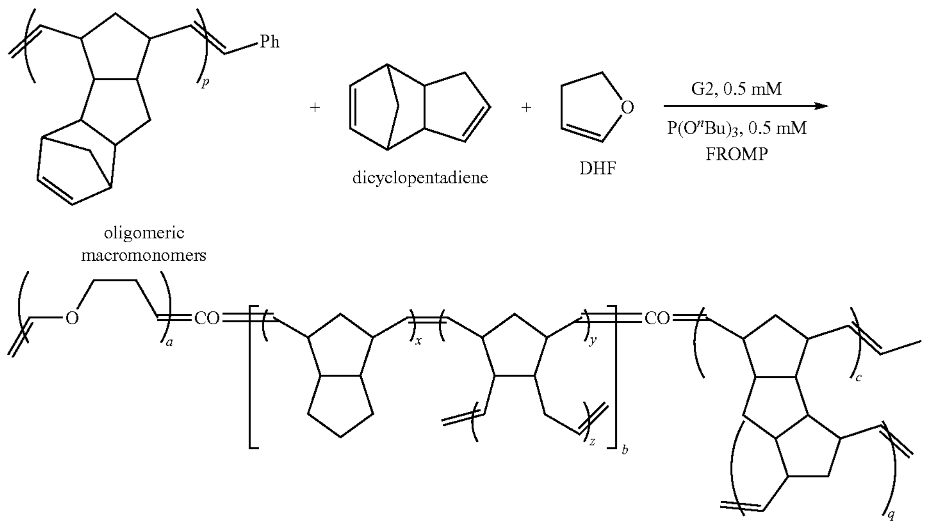

oligomeric macromonomers
dicyclopentadiene
DHF
thermoset (polymer)

Figure 20:
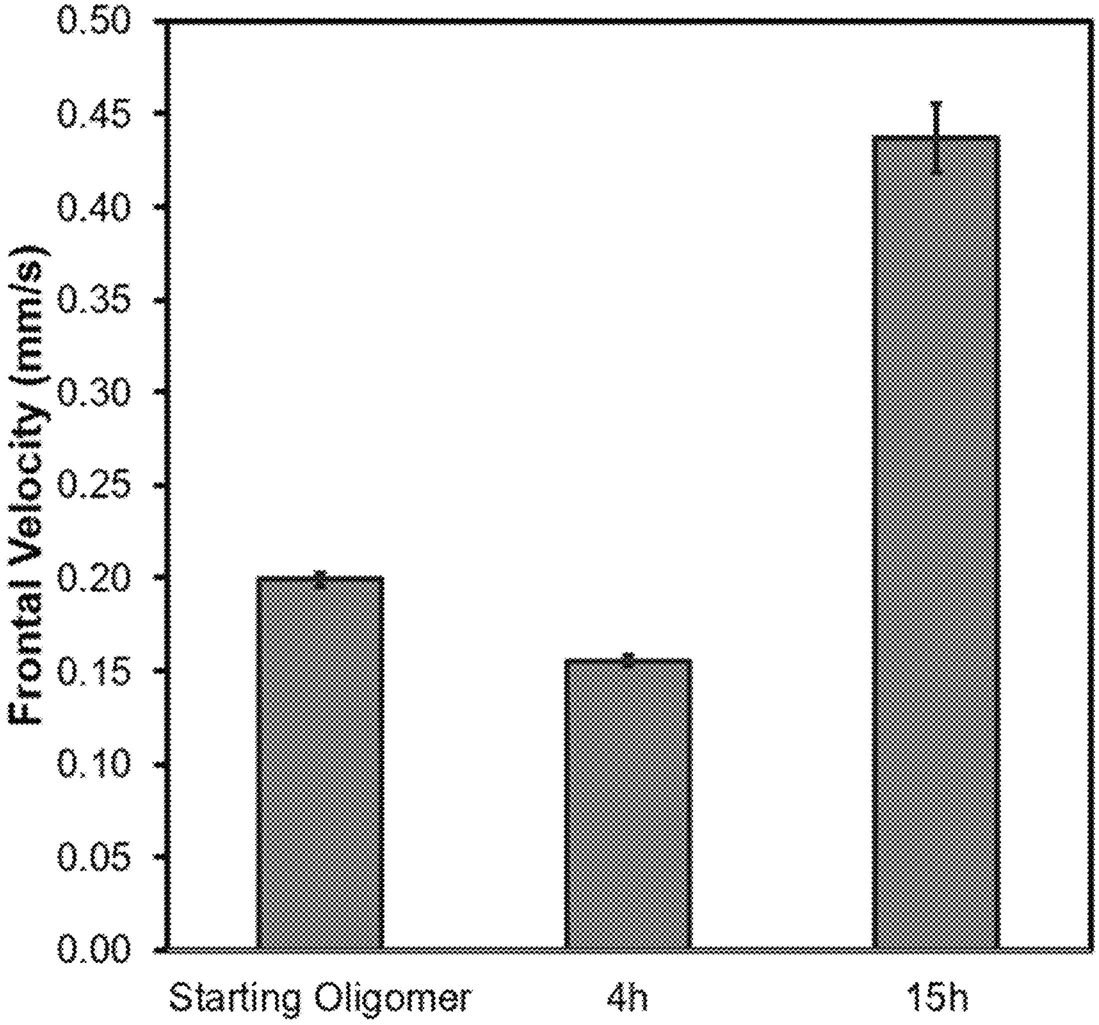
FIG. 20 illustrates the frontal velocity of FROMP performed on each of the initial reaction mixture for preparation of oligomeric macromonomers, the product mixture after 4 hours of reaction to produce oligomeric macromonomers, and the product mixture after 15 hours of reaction to produce oligomeric macromonomers, the $^1H$ NMR spectra of which are illustrated in the bottom, middle, and top, respectively, of FIG. 17.

Partially functionalized oligomeric macromonomers (14% mass increase, ≈3 norbornenyl-like fragments per oligomer) underwent FROMP in a mixture with DCPD. As illustrated in FIG. 20, formulations including 10 weight % of the oligomeric macromonomer underwent FROMP (9:1 DCPD:oligomeric macromonomers, G2 100 ppm (0.05 M), TBP (1 equiv.)) with $v_f$ of 0.45 mm·s$^{-1}$, whereas analogous formulations with unfunctionalized o(DCPD) proceeded with $v_f$ of 0.20 mm·s$^{-1}$.

Although the present disclosure has been described with reference to examples and the accompanying drawings, the present disclosure is not limited thereto, but may be variously modified and altered by those skilled in the art to which the present disclosure pertains without departing from the spirit and scope of the present disclosure.

The subject-matter of the disclosure may also relate, among others, to the following aspects:

A first aspect relates to a method for recycling oligomeric units derived from a first polymer into a second polymer, the method comprising: deconstructing the first polymer to produce the oligomer units, wherein the first polymer and the oligomeric units each comprise a cycloalkenyl moiety that is not functionalized or ring-strained; endothermically reacting the oligomeric units with an amount of a compound to produce oligomeric macromonomers, the oligomeric macromonomers each comprising a functionalized or ring-strained cycloalkenyl moiety; and polymerizing the oligomeric macromonomers to produce the second polymer.

A second aspect relates to the method of aspect 1, wherein the deconstructing comprises contacting the first polymer with an acidic solution, a basic solution, or a source of fluoride ion.

A third aspect relates to the method of aspect 1 or 2, wherein the compound is a diene.

A fourth aspect relates to the method of any one of aspects 1 to 3, wherein the endothermically reacting comprises heating the oligomeric units and the compound to a temperature of from about 100 to about 300° C.

A fifth aspect relates to the method of any one of aspects 1 to 4, wherein the oligomeric macromonomers each have a higher mass than the oligomeric units of a same degree of polymerization.

A sixth aspect relates to the method of any one of aspects 1 to 5, wherein a mass difference between the oligomeric macromonomers and the oligomeric units corresponds at least approximately to a multiple of a molecular mass, or a plurality of multiples of the molecular mass, of the compound or a molecular mass of a reactive species generated in situ from the compound.

A seventh aspect relates to the method of any one of aspects 1 to 6, wherein the polymerizing comprises: adding an amount of a phosphite ester and an amount of a catalyst to an amount of the oligomeric macromonomers, a functionalized cycloalkene, and an amount of a cleavable co-monomer to provide a mixture; and heating the mixture to produce the second polymer.

An eighth aspect relates to the method of aspect 7, wherein the catalyst is a Grubbs catalyst.

A ninth aspect relates to the method of aspect 7 or 8, wherein the catalyst is G2:

G2

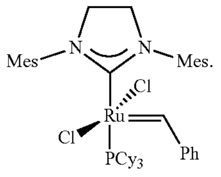

A tenth aspect relates to the method of any one of aspects 7 to 9, wherein the functionalized cycloalkene is dicyclopentadiene, 1,5-cyclooctadiene, norbornene, or 5-ethylidene-2-norbornene.

An eleventh aspect relates to the method of any one of aspects 7 to 10, wherein the cleavable co-monomer is 2,3-dihydrofuran ("DHF").

A twelfth aspect relates to the method of any one of aspects 1 to 11, wherein the first polymer is a product of polymerization of dicyclopentadiene.

A thirteenth aspect relates to the method of any one of aspects 1 to 12, wherein the compound is dicyclopentadiene.

A fourteenth aspect relates to the method of any one of aspects 1 to 13, wherein the functionalized cycloalkenyl moiety is a norbornenyl moiety.

A fifteenth aspect relates to a method of preparing oligomeric macromonomers from oligomeric units, comprising endothermically reacting the oligomeric units with an amount of a compound to produce the oligomeric macromonomers; wherein the oligomeric macromonomers each comprise a functionalized cycloalkenyl moiety; and wherein the oligomeric units each comprise cycloalkenyl moieties that are not functionalized or ring-strained.

A sixteenth aspect relates to the method of aspect 15, wherein the compound is a diene.

A seventeenth aspect relates to the method of aspect 15 or 16, wherein the endothermically reacting comprises heating the oligomeric units and the compound to a temperature of from about 100 to about 500° C.

An eighteenth aspect relates to the method of any one of aspects 15 to 17, wherein the oligomeric macromonomers each have a higher mass than the oligomeric units of a same degree of polymerization.

A nineteenth aspect relates to the method of any one of aspects 15 to 18, wherein a mass difference between the oligomeric macromonomers and the oligomeric units corresponds at least approximately to a multiple of a molecular mass, or a plurality of multiples of the molecular mass, of the compound or a molecular mass of a reactive species generated in situ from the compound.

A twentieth aspect relates to the method of any one of aspects 15 to 19, wherein the second compound is dicyclopentadiene.

A twenty-first aspect relates to a method of polymerizing oligomeric macromonomers, comprising: adding an amount of a phosphite ester and an amount of a catalyst to an amount of oligomeric macromonomers, an amount of a compound, and an amount of a cleavable co-monomer to provide a mixture, the oligomeric macromonomers each comprising a functionalized cycloalkenyl moiety; and heating the mixture to produce a polymer.

A twenty-second aspect relates to the method of aspect 21, wherein the catalyst is a Grubbs catalyst.

A twenty-third aspect relates to the method of aspect 21 or 22, wherein the catalyst is G2:

G2

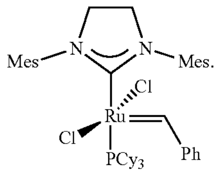

A twenty-fourth aspect relates to the method of any one of aspects 21 to 23, wherein the functionalized cycloalkenyl moiety is a norbornenyl moiety.

A twenty-fifth aspect relates to the method of any one of aspects 21 to 24, wherein the oligomeric macromonomers each comprise a plurality of the functionalized cycloalkenyl moiety.

A twenty-sixth aspect relates to the method of any one of aspects 21 to 25, wherein the cleavable co-monomer is 2,3-dihydrofuran.

A twenty-seventh aspect relates to the method of any one of aspects 21 to 26, wherein the compound is dicyclopentadiene.

In addition to the features mentioned in each of the independent aspects enumerated above, some examples may show, alone or in combination, the optional features mentioned in the dependent aspects and/or as disclosed in the description above and shown in the figures.

What is claimed is:

1. A method for recycling oligomeric units derived from a first polymer into a second polymer, the method comprising:

deconstructing the first polymer to produce the oligomeric units, wherein the first polymer and the oligomeric units each comprise a cycloalkenyl moiety that is not functionalized or ring-strained;

endothermically reacting the oligomeric units with an amount of a compound to produce oligomeric macromonomers, the oligomeric macromonomers each comprising a functionalized or ring-strained cycloalkenyl moiety; and polymerizing the oligomeric macromonomers to produce the second polymer.

2. The method of claim 1, wherein the deconstructing comprises contacting the first polymer with an acidic solution, a basic solution, or a source of fluoride ion.

3. The method of claim 1, wherein the compound is a diene.

4. The method of claim 1, wherein the endothermically reacting comprises heating the oligomeric units and the compound to a temperature of from about 100 to about 300° C.

5. The method of claim 1, wherein a mass difference between the oligomeric macromonomers and the oligomeric units corresponds at least approximately to a multiple of a molecular mass, or a plurality of multiples of the molecular mass, of the compound or a molecular mass of a reactive species generated in situ from the compound.

6. The method of claim 1, wherein the polymerizing comprises:

adding an amount of a phosphite ester and an amount of a catalyst to an amount of the oligomeric macromonomers, a functionalized cycloalkene, and an amount of a cleavable co-monomer to provide a mixture; and heating the mixture to produce the second polymer.

7. The method of claim 6, wherein the catalyst is G2:

G2

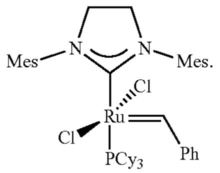

8. The method of claim 6, wherein the functionalized cycloalkene is dicyclopentadiene, 1,5-cyclooctadiene, norbornene, or 5-ethylidene-2-norbornene.

9. The method of claim 6, wherein the cleavable co-monomer is 2,3-dihydrofuran ("DHF").

10. The method of claim 1, wherein the first polymer is a product of polymerization of dicyclopentadiene.

11. The method of claim 1, wherein the compound is dicyclopentadiene.

12. The method of claim 1, wherein the functionalized cycloalkenyl moiety is a norbornenyl moiety.

13. A method of preparing oligomeric macromonomers from oligomeric units, comprising endothermically reacting the oligomeric units with an amount of a compound to produce the oligomeric macromonomers;

wherein the oligomeric macromonomers each comprise a functionalized cycloalkenyl moiety; and wherein the oligomeric units each comprise cycloalkenyl moieties that are not functionalized or ring-strained.

14. The method of claim 13, wherein the compound is a diene.

15. The method of claim 13, wherein the endothermically reacting comprises heating the oligomeric units and the compound to a temperature of from about 100 to about 500° C.

16. The method of claim 13, wherein a mass difference between the oligomeric macromonomers and the oligomeric units corresponds at least approximately to a multiple of a molecular mass, or a plurality of multiples of the molecular mass, of the compound or a molecular mass of a reactive species generated in situ from the compound.

17. A method of polymerizing oligomeric macromonomers, comprising:

adding an amount of a phosphite ester and an amount of a catalyst to an amount of oligomeric macromonomers, an amount of a compound, and an amount of a cleavable co-monomer to provide a mixture, the oligomeric macromonomers each comprising a functionalized cycloalkenyl moiety; and heating the mixture to produce a polymer.

18. The method of claim 17, wherein the functionalized cycloalkenyl moiety is a norbornenyl moiety.

19. The method of claim 17, wherein the cleavable co-monomer is 2,3-dihydrofuran.

20. The method of claim 17, wherein the compound is dicyclopentadiene.

* * * * *